United States Patent
Onozaki et al.

(10) Patent No.: US 9,236,636 B2
(45) Date of Patent: Jan. 12, 2016

(54) NON-AQUEOUS ELECTROLYTE SOLUTION FOR SECONDARY BATTERIES, AND LITHIUM ION SECONDARY BATTERY

(71) Applicant: ASAHI GLASS COMPANY, LIMITED, Chiyoda-ku (JP)

(72) Inventors: Yu Onozaki, Tokyo (JP); Toyokazu Enta, Tokyo (JP); Masao Iwaya, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 16 days.

(21) Appl. No.: 14/227,454

(22) Filed: Mar. 27, 2014

(65) Prior Publication Data

US 2014/0322616 A1    Oct. 30, 2014

Related U.S. Application Data

(63) Continuation of application No. PCT/JP2013/057445, filed on Mar. 15, 2013.

(30) Foreign Application Priority Data

Mar. 27, 2012  (JP) ................. 2012-071067
Mar. 27, 2012  (JP) ................. 2012-071068
Oct. 22, 2012  (JP) ................. 2012-233286
Feb. 7, 2013   (JP) ................. 2013-022593

(51) Int. Cl.
*H01M 10/0525* (2010.01)
*H01M 10/0569* (2010.01)

(52) U.S. Cl.
CPC ...... *H01M 10/0569* (2013.01); *H01M 10/0525* (2013.01); *H01M 2300/0034* (2013.01); *H01M 2300/0037* (2013.01); *Y02E 60/122* (2013.01); *Y02T 10/7011* (2013.01)

(58) Field of Classification Search
CPC ............ H01M 10/0525; H01M 10/0569; H01M 2300/0037; H01M 2300/0034
See application file for complete search history.

(56) References Cited

U.S. PATENT DOCUMENTS

| 2012/0214073 A1 | 8/2012 | Iwaya et al. |
| 2013/0101904 A1 | 4/2013 | Onozaki et al. |
| 2013/0108932 A1 | 5/2013 | Onozaki et al. |

FOREIGN PATENT DOCUMENTS

| JP | 6-20719 | 1/1994 |
| JP | 8-37024 | 2/1996 |
| JP | 2004-087136 A | 3/2004 |
| JP | 2005-38722 | 2/2005 |
| JP | 2008-108454 | 5/2008 |
| JP | 2008-521161 | 6/2008 |
| JP | 2008-192504 | 8/2008 |
| JP | 2008-257988 | 10/2008 |
| JP | 2010-86914 | 4/2010 |
| JP | 2010-086915 A | 4/2010 |
| WO | 2009/133899 | 11/2009 |
| WO | WO 2012/011508 A1 | 1/2012 |

OTHER PUBLICATIONS

International Search Report issued Jun. 4, 2013 in PCT/JP2013/057445 filed Mar. 15, 2013.
U.S. Appl. No. 14/631,356, filed Feb. 25, 2015, Onozaki, et al.
J.S. Gnanaraj, et al., "The use of accelerating rate calorimetry (ARC) for the study of the thermal reactions of Li-ion battery electrolyte solutions", Journal of Power Sources, vol. 119-121, 2003, pp. 794-798.

*Primary Examiner* — Muhammad Siddiquee
(74) *Attorney, Agent, or Firm* — Oblon, McClelland, Maier & Neustadt, L.L.P.

(57) ABSTRACT

A non-aqueous electrolyte solution for secondary batteries, comprising a lithium salt (total number of moles of lithium atoms: $N_{Li}$) and a liquid composition, wherein the liquid composition comprises a specific fluorinated solvent ($\alpha$) and a cyclic carboxylic acid ester compound (total number of moles: $N_A$), and may contain a specific compound ($\beta$) (total number of moles: $N_B$), the content of the fluorinated solvent ($\alpha$) is from 40 to 80 mass %, $N_A/N_{Li}$ is from 1.5 to 7.0, and $(N_A+N_B)/N_{Li}$ is from 3 to 7.0; and, a lithium ion secondary battery employing such a non-aqueous electrolyte solution for secondary batteries.

18 Claims, No Drawings

NON-AQUEOUS ELECTROLYTE SOLUTION FOR SECONDARY BATTERIES, AND LITHIUM ION SECONDARY BATTERY

TECHNICAL FIELD

The present invention relates to a non-aqueous electrolyte solution for secondary batteries, and a lithium ion secondary battery.

BACKGROUND ART

For a non-aqueous electrolyte solution to be used for lithium ion secondary batteries (hereinafter sometimes referred to simply as "secondary batteries"), a carbonate type solvent such as ethylene carbonate or dimethyl carbonate, has been widely used in that it usually dissolves a lithium salt excellently to provide a high lithium ion conductivity (hereinafter referred to simply as "conductivity"), and it has a wide potential window. However, a carbonate type solvent is flammable and is likely to catch fire by e.g. heat generation of the batteries.

As a method to increase non-flammability (flame retardancy) without deteriorating the performance as a non-aqueous electrolyte, it has been proposed to add a fluorinated solvent (Patent Document 1). However, the fluorinated solvent has a low ability to dissolve the lithium salt and tends to deteriorate the cycle properties.

Under the circumstances, it has been proposed to incorporate a glyme type solvent to a fluorinated solvent having a high non-flammability (flame retardancey) as the main component, to let the lithium salt and the glyme solvent form a complex thereby to obtain a non-aqueous electrolyte solution excellent in the solubility of the lithium salt (Patent Document 2).

Further, a non-aqueous electrolyte solution has been proposed which comprises a fluorinated solvent, a cyclic carbonate, a cyclic carboxylic acid ester and a lithium salt (Patent Documents 3 and 4). However, as a result of a study conducted by the present inventors, it has been found that there has been either problem such that the reactivity with the electrodes is so high that the stability is inadequate, or the conductivity is so low that it is poor for practical application. Thus, it has been difficult to lower the reactivity of the non-aqueous electrolyte solution with the electrodes, while securing the practically sufficient conductivity.

In general, with a secondary battery, the battery temperature will be raised due to Joule heat or external heating, and if the battery temperature reaches such a high temperature that exceeds 150° C., thermal runaway may occur to destroy the battery. As a cause for thermal runaway, it is known that an electrolyte solution is reacted with a positive electrode and a negative electrode, whereby they are decomposed to generate heat. That is, thermal runaway starts as the temperature of a secondary battery has reached a temperature at which the electrolyte solution is reacted with the positive electrode and the negative electrode by e.g. Joule heat, so that they undergo thermal decomposition. Therefore, it is important for a non-aqueous electrolyte solution to be used for a secondary battery that the reactivity with the positive electrode and the negative electrode is low, and heat generation is less likely to occur by a reaction therewith.

In recent years, it has been actively studied to apply secondary batteries to e.g. power sources for vehicles such as electric automobiles which require larger energies, and a non-aqueous electrolyte solution having a lower reactivity with a positive electrode and a negative electrode is desired.

Further, in order to obtain a larger energy efficiently, it is required not only to lower the reactivity of the non-aqueous electrolyte solution with a positive electrode and a negative electrode, but also to have excellent rate properties, initial charge/discharge properties and cycle properties provided.

PRIOR ART DOCUMENTS

Patent Documents

Patent Document 1: JP-A-8-037024
Patent Document 2: WO 2009/133899
Patent Document 3: JP-A-2008-192504
Patent Document 4: JP-A-2008-257988

DISCLOSURE OF INVENTION

Technical Problem

It is an object of the present invention to provide a non-aqueous electrolyte solution for secondary batteries, which is excellent in cycle properties, has a low reactivity with a positive electrode and a negative electrode, makes a secondary battery less susceptible to thermal runaway, provides a practically sufficient conductivity and further has excellent rate properties and initial charge/discharge properties, and a lithium ion secondary battery employing such a non-aqueous electrolyte solution for secondary batteries.

Solution to Problem

In order to accomplish the above object, the present invention has adopted the following constructions.

[1] A non-aqueous electrolyte solution for secondary batteries, comprising a lithium salt and a liquid composition, wherein the liquid composition comprises at least one fluorinated solvent ($\alpha$) selected from the group consisting of a fluorinated ether compound, a fluorinated chain carboxylic acid ester compound and a fluorinated chain carbonate compound, and a cyclic carboxylic acid ester compound, and may contain at least one compound ($\beta$) selected from the group consisting of a saturated cyclic carbonate compound having no fluorine atom, a chain carbonate compound having no fluorine atom, a saturated cyclic sulfone compound and a phosphoric acid ester compound, the proportion of the mass of the fluorinated solvent ($\alpha$) to the total mass of the non-aqueous electrolyte solution is from 40 to 80 mass %, $N_A/N_{Li}$ i.e. the ratio of the total number of moles ($N_A$) of the cyclic carboxylic acid ester compound to the total number of moles ($N_{Li}$) of lithium atoms derived from the lithium salt, is from 1.5 to 7.0, and $(N_A+N_B)/N_{Li}$ i.e. the ratio of the sum of said $N_A$ and the total number of moles ($N_B$) of the compound ($\beta$) to said $N_{Li}$ is from 3 to 7.0.

[2] The non-aqueous electrolyte solution for secondary batteries according to [1], wherein said $N_A/N_{Li}$ is from 1.5 to 5.5, and said $(N_A+N_B)/N_{Li}$ is from 3 to 6.5.

[3] The non-aqueous electrolyte solution for secondary batteries according to [2], wherein the liquid composition further contains an unsaturated cyclic carbonate compound having no fluorine atom.

[4] The non-aqueous electrolyte solution for secondary batteries according to [3], wherein the content of the unsaturated cyclic carbonate compound having no fluorine atom in the non-aqueous electrolyte solution is from 0.01 to 10 mass %.

[5] The non-aqueous electrolyte solution for secondary batteries according to [2], wherein the liquid composition further contains a fluorinated cyclic carbonate compound.

[6] The non-aqueous electrolyte solution for secondary batteries according to [5], wherein the content of the fluorinated cyclic carbonate compound in the non-aqueous electrolyte solution is from 0.01 to 10 mass %.

[7] The non-aqueous electrolyte solution for secondary batteries according to any one of [1] to [6], wherein the liquid composition contains the saturated cyclic carbonate compound having no fluorine atom.

[8] The non-aqueous electrolyte solution for secondary batteries according to any one of [1] to [7], wherein the liquid composition contains the chain carbonate compound having no fluorine atom.

[9] The non-aqueous electrolyte solution for secondary batteries according to any one of [1] to [8], wherein the liquid composition contains the fluorinated ether compound.

[10] The non-aqueous electrolyte solution for secondary batteries according to any one of [1] to [9], wherein the cyclic carboxylic acid ester compound is at least one member selected from the group consisting of γ-butyrolactone and γ-valerolactone.

[11] The non-aqueous electrolyte solution for secondary batteries according to any one of [1] to [10], wherein the proportion of the mass of the cyclic carboxylic acid ester compound to the total mass of the non-aqueous electrolyte solution is from 4 to 50 mass %.

[12] The non-aqueous electrolyte solution for secondary batteries according to any one of [1] to [11], wherein the lithium ion conductivity at 25° C. of the non-aqueous electrolyte solution is at least 0.3 S/m.

[13] The non-aqueous electrolyte solution for secondary batteries according to any one of [1] to [12], wherein at least a part of the lithium salt is $LiPF_6$.

[14] The non-aqueous electrolyte solution for secondary batteries according to any one of [1] to [13], wherein the content of the lithium salt in the non-aqueous electrolyte solution is from 0.1 to 3.0 mol/L.

[15] A lithium ion secondary battery comprising a positive electrode containing, as an active material, a material capable of absorbing and desorbing lithium ions, a negative electrode containing, as an active material, at least one member selected from the group consisting of metal lithium, an lithium alloy and a carbon material capable of absorbing and desorbing lithium ions, and the non-aqueous electrolyte solution for secondary batteries as defined in any one of [1] to [14].

Advantageous Effects of Invention

The non-aqueous electrolyte solution for secondary batteries of the present invention, has excellent rate properties, initial charge/discharge properties and cycle properties, has a low reactivity with a positive electrode and a negative electrode, makes a secondary battery less susceptible to thermal runaway and further makes it possible to obtain a secondary battery which has excellent cycle properties and practically sufficient conductivity.

Further, the lithium ion secondary battery of the present invention is less susceptible to thermal runaway and excellent in rate properties, initial charge/discharge properties and cycle properties and has practically sufficient conductivity, since it employs the non-aqueous electrolyte solution for secondary batteries of the present invention.

DESCRIPTION OF EMBODIMENTS

In this specification, a compound represented by the formula (1) will be referred to as a compound (1), unless otherwise specified, and the same applies to compounds represented by other formulae.

In this specification, "fluorinated" means that some or all of hydrogen atoms bonded to carbon atoms are substituted by fluorine atoms. A "fluorinated alkyl group" is a group having some or all of hydrogen atoms in an alkyl group substituted by fluorine atoms. In a partly fluorinated group, hydrogen atoms and fluorine atoms are present. Further, a "perfluoroalkyl group" is a group having all of hydrogen atoms in an alkyl group substituted by fluorine atoms. Further, a "carbon-carbon unsaturated bond" is a carbon-carbon double bond or a carbon-carbon triple bond.

<Non-Aqueous Electrolyte Solution for Secondary Batteries>

The non-aqueous electrolyte solution for secondary batteries of the present invention (hereinafter sometimes referred to simply as "the non-aqueous electrolyte solution") comprises a lithium salt and a liquid composition. The liquid composition comprises at least one fluorinated solvent (α) selected from the group consisting of a fluorinated ether compound, a fluorinated chain carboxylic acid ester compound and a fluorinated chain carbonate compound, and a cyclic carboxylic acid ester compound.

Further, the non-aqueous electrolyte solution for secondary batteries of the present invention may contain, as the liquid composition, an unsaturated cyclic carbonate compound having no fluorine atom (hereinafter sometimes referred to as a "non-fluorinated unsaturated carbonate compound") and/or a fluorinated cyclic carbonate compound.

A non-aqueous electrolyte solution is an electrolyte solution containing substantially no water, and even if it contains water, the amount of water is within such a range that performance degradation of a secondary battery using the non-aqueous electrolyte solution is thereby not observed. The amount of water contained in such a non-aqueous electrolyte solution is preferably at most 500 mass ppm, more preferably at most 100 mass ppm, particularly preferably at most 50 mass ppm, based on the total mass of the non-aqueous electrolyte solution. The lower limit of the amount of water is 0 mass ppm.

Lithium Salt

The lithium salt is an electrolyte which will be dissociated in the non-aqueous electrolyte solution to supply lithium ions. As such a lithium salt, preferred is a lithium salt selected from the group consisting of $LiPF_6$, the following compound (A) (wherein k is an integer of from 1 to 5), $FSO_2N(Li)SO_2F$, $CF_3SO_2N(Li)SO_2CF_3$, $CF_3CF_2SO_2N(Li)SO_2CF_2CF_3$, $LiClO_4$, the following compound (B), the following compound (C), the following compound (D), the following compound (E) and $LiBF_4$. As the lithium salt, more preferred is a lithium salt selected from the group consisting of $LiPF_6$, $LiBF_4$ and the compound (A), and further preferred is $LiPF_6$.

The lithium salt to be contained in the non-aqueous electrolyte solution of the present invention may be one type only, or two or more types in combination. As the combination in a case where two or more lithium salts are used in combination, those combinations as disclosed in WO 2009/133899 may be mentioned.

When $LiPF_6$ is used, high conductivity is obtainable, but it is hardly soluble in a fluorinated solvent as compared with other lithium salts such as $CF_3CF_2SO_2N(Li)$ $SO_2CF_2CF_3$.

Further, LiPF$_6$ is susceptible to thermal decomposition by nature. However, even in a fluorinated solvent, by using LiPF$_6$ in combination with a cyclic carboxylic acid ester compound, the solubility of LiPF$_6$ will be improved, and LiPF$_6$ will be uniformly dissolved, whereby it is possible to readily obtain a non-aqueous electrolyte solution having practically sufficient conductivity. Further, by incorporating a specific amount of a cyclic carboxylic acid ester compound, even an electrolyte employing LiPF$_6$, tends to be less susceptible to thermal runaway.

As the lithium salt contained in the non-aqueous electrolyte solution of the present invention, at least a part thereof is preferably LiPF$_6$. The lower limit in the molar ratio of LiPF$_6$ to the total number of moles of the lithium salt contained in the non-aqueous electrolyte solution of the present invention, is preferably 40 mol %, more preferably 50 mol %, further preferably 65 mol %, particularly preferably 80 mol %. The upper limit in the molar ratio of LiPF$_6$ to the total number of moles of the lithium salt contained in the non-aqueous electrolyte solution, is 100 mol %. When the molar ratio of LiPF$_6$ to the total number of moles of the lithium salt is at least the lower limit value, such a non-aqueous electrolyte solution will be excellent in conductivity and highly practically useful.

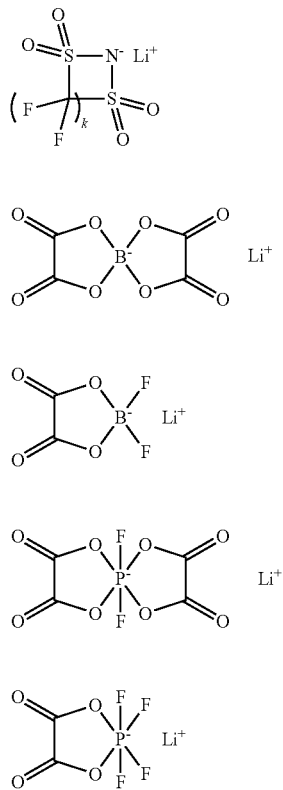

As the compound (A), the following compounds (A-1) to (A-4) may, for example, be mentioned. From such a viewpoint that a non-aqueous electrolyte solution having high conductivity is readily obtainable, the compound (A) is preferably the compound (A-2) wherein k is 2. More preferably, the compound (A) contained in the non-aqueous electrolyte solution is composed solely of the compound (A-2) wherein k is 2.

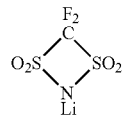 (A-1)

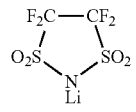 (A-2)

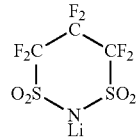 (A-3)

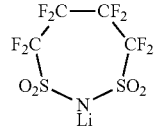 (A-4)

The content of the lithium salt in the non-aqueous electrolyte solution is not particularly limited, but is preferably from 0.1 to 3.0 mol/L. The lower limit in the content of the lithium salt is more preferably 0.5 mol/L, further preferably 0.8 mol/L. Further, the upper limit in the content of the lithium salt is more preferably 1.8 mol/L, further preferably 1.6 mol/L.

In terms of mass %, the proportion of the mass of the lithium salt to the total mass of the non-aqueous electrolyte solution, is preferably from 5 mass % to 25 mass %. The lower limit value in the proportion of the mass of the lithium salt is more preferably 7 mass %, further preferably 8 mass %. Further, the upper limit value in the proportion of the mass of the lithium salt is more preferably 20 mass %, further preferably 17 mass %.

When the proportion of the lithium salt is at least the above lower limit value, the conductivity of the non-aqueous electrolyte solution is high. Further, when the proportion of the lithium salt is at most the above upper limit value, the lithium salt is readily uniformly soluble in the liquid composition, and the lithium salt will not precipitate even under a low temperature condition.

Fluorinated Solvent (α)

The liquid composition in the non-aqueous electrolyte solution of the present invention contains at least one fluorinated solvent (α) selected from the group consisting of a fluorinated ether compound, a fluorinated chain carboxylic acid ester compound and a fluorinated chain carbonate compound. The fluorinated solvent (α) is a solvent having fluorine atoms in its molecule and is excellent in non-flammability. The fluorinated solvent (α) contained in the liquid composition may be one type only, or two or more types in combination. In a case where the fluorinated solvent (α) contained in the liquid composition is two or more types, their mutual ratio may be optionally determined.

The fluorinated solvent (α) contained in the liquid composition is preferably such that at least a part thereof is a fluorinated ether compound. The fluorinated ether compound is preferably a fluorinated ether compound selected from the group consisting of the following compound (1) and the following compound (2). The fluorinated ether compound contained in the liquid composition may be one type only, or two or more types in combination. In a case where the fluorinated ether compound contained in the liquid composition is two or more types, their mutual ratio may be optionally determined.

$$R^1-O-R^2 \quad (1)$$

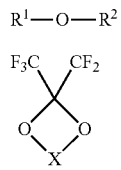
(2)

Here, in the formula (1), each of $R^1$ and $R^2$ which are independent of each other, is a $C_{1-10}$ alkyl group, a $C_{3-10}$ cycloalkyl group, a $C_{1-10}$ fluorinated alkyl group or a $C_{3-10}$ fluorinated cycloalkyl group, a $C_{2-10}$ alkyl group having at least one etheric oxygen atom, or a $C_{2-10}$ fluorinated alkyl group having at least one etheric oxygen atom, and either one or each of $R^1$ and $R^2$ is a $C_{1-10}$ fluorinated alkyl group, a $C_{3-10}$ fluorinated cycloalkyl group, or a $C_{2-10}$ fluorinated alkyl group having at least one etheric oxygen atom.

Further, in the formula (2), X is a $C_{1-5}$ alkylene group, a $C_{1-5}$ fluorinated alkylene group, a $C_{2-5}$ alkylene group having at least one etheric oxygen atom, or a $C_{2-5}$ fluorinated alkylene group having at least one etheric oxygen atom.

Each of the alkyl group and the alkyl group having an etheric oxygen atom may be a group having a straight chain structure, a branched structure or a partially cyclic structure (e.g. a cycloalkylalkyl group).

Either one or each of $R^1$ and $R^2$ in the compound (1) is a $C_{1-10}$ fluorinated alkyl group, a $C_{3-10}$ fluorinated cycloalkyl group, or a $C_{2-10}$ fluorinated alkyl group having at least one etheric oxygen atom. When either one or each of $R^1$ and $R^2$ is such a group, the solubility of the lithium salt in the non-aqueous electrolyte solution and the non-flammability of the non-aqueous electrolyte solution tend to be excellent. $R^1$ and $R^2$ in the compound (1) may be the same or different.

As the compound (1), a compound (hereinafter referred to as a compound (1-A)) wherein each of $R^1$ and $R^2$ is a $C_{1-10}$ fluorinated alkyl group, a compound (hereinafter referred to as a compound (1-B)) wherein $R^1$ is a $C_{2-10}$ fluorinated alkyl group having at least one etheric oxygen atom and $R^2$ is a $C_{1-10}$ fluorinated alkyl group, and a compound (hereinafter referred to as a compound (1-C)) wherein $R^1$ is a $C_{1-10}$ fluorinated alkyl group and $R^2$ is a $C_{1-10}$ alkyl group, are preferred; the compound (1-A) and the compound (1-C) are more preferred; and the compound (1-A) is particularly preferred.

The total number of carbon atoms in the compound (1) is preferably from 4 to 10, more preferably from 4 to 8, since if it is too small, the boiling point tends to be too low, and if it is too large, the viscosity tends to be high. The molecular weight of the compound (1) is preferably from 150 to 800, more preferably 150 to 500, particularly preferably from 200 to 500. The number of etheric oxygen atoms in the compound (1) is influential to flammability. Therefore, the number of etheric oxygen atoms in the compound (1) having etheric oxygen atoms is preferably from 1 to 4, more preferably 1 or 2, further preferably 1. Further, when the fluorine content in the compound (1) (the fluorine content being the proportion of the total mass of fluorine atoms in the molecular weight) is high, the non-flammability will be excellent. The fluorine content in the compound (1) is preferably at least 50 mass %, more preferably at least 60 mass %.

The compound (1) is preferably a compound wherein each of $R^1$ and $R^2$ is an alkyl group having some of its hydrogen atoms fluorinated, since the solubility of the lithium salt in the liquid composition is thereby excellent.

Particularly, the compound (1) is preferably a compound wherein the terminal of either one or each of $R^1$ and $R^2$ is —$CF_2H$, in that the solubility of the lithium salt in the liquid composition is thereby excellent.

Specific examples of the compound (1-A), the compound (1-B) and the fluorinated ether compounds other than the compound (1-A) and the compound (1-B) may, for example, be compounds disclosed in WO 2009/133899.

The compound (1) is preferably the compound (1-A), more preferably a compound selected from the group consisting of $CF_3CH_2OCF_2CHF_2$ (trade name: AE-3000, manufactured by Asahi Glass Company Limited), $CF_3CH_2OCF_2CHFCF_3$, $CHF_2CF_2CH_2OCF_2CHF_2$, $CH_3CH_2CH_2OCF_2CHF_2$, $CH_3CH_2OCF_2CHF_2$ and $CHF_2CF_2CH_2OCF_2CHFCF_3$, particularly preferably $CF_3CH_2OCF_2CHF_2$ or $CHF_2CF_2CH_2OCF_2CHFCF_3$.

In the compound (2), X may have a straight chain structure or a branched structure. X is preferably a $C_{1-5}$ alkylene group, more preferably a $C_{2-4}$ alkylene group. Such an alkylene group preferably has a straight chain structure or a branched structure. In a case where the alkylene group for X has a branched structure, the side chain is preferably a $C_{1-3}$ alkyl group, or a $C_{1-3}$ alkyl group having an etheric oxygen atom.

The compound (2) is preferably a compound of the formula (2) wherein X is an alkylene group selected from the group consisting of —$CH_2$—, —$CH_2CH_2$—, —$CH(CH_3)CH_2$— and —$CH_2CH_2CH_2$—, more preferably a compound wherein X is —$CH_2CH_2$—, or a compound wherein X is —$CH(CH_3)CH_2$—.

Specific examples of the compound (2) may, for example, be compounds represented by the following formulae.

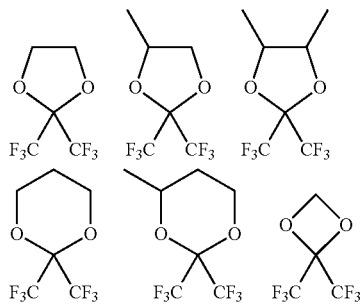

When the fluorinated ether compound is the compound (1) or the compound (2), the non-aqueous electrolyte solution tends to uniformly dissolve the lithium salt, and tends to be excellent in non-flammability and to have high conductivity.

As the fluorinated ether compound, it is preferred to use the compound (1), the compound (2), or a mixture of the compound (1) and the compound (2), and it is more preferred to use the compound (1) alone, or the compound (2) alone.

In a case where the liquid composition in the present invention contains the compound (1), the compound (1) to be contained, may be one type alone, or two or more types in combination. Further, in a case where the liquid composition in the present invention contains the compound (2), the compound (2) to be contained, may be one type alone, or two or more types in combination.

In a case where the compound (1) (mass: Va) and the compound (2) (mass: Vb) are used in combination as the fluorinated ether compound, their mass ratio (Vb/Va) is preferably from 0.01 to 100, more preferably from 0.1 to 10.

The fluorinated chain carboxylic acid ester compound is a chain compound which has no ring structure, has an ester bond and has fluorine atom(s). Further, the fluorinated chain carbonate compound is a chain compound which has no ring structure, has a carbonate bond represented by —O—C(=O)—O— and has fluorine atom(s).

As the fluorinated chain carboxylic acid ester compound, the following compound (3) is preferred.

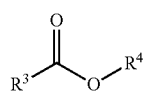
(3)

Here, in the formula (3), each of $R^3$ and $R^4$ which are independent of each other, is a $C_{1-3}$ alkyl group or a $C_{1-3}$ fluorinated alkyl group, and either one or each of $R^3$ and $R^4$ is a $C_{1-3}$ fluorinated alkyl group.

Each of the alkyl group and the fluorinated alkyl group may have a straight chain structure or a branched structure.

When either one or each of $R^3$ and $R^4$ is the fluorinated alkyl group, the oxidation resistance and non-flammability of the compound (3) are improved. $R^3$ and $R^4$ in the compound (3) may be the same or different.

$R^3$ is preferably a methyl group, an ethyl group, a difluoromethyl group, a trifluoromethyl group, a tetrafluoroethyl group or a pentafluoroethyl group, more preferably a difluoromethyl group or a trifluoromethyl group.

$R^4$ is preferably a methyl group, an ethyl group, a trifluoromethyl group, a 2-fluoroethyl group, a 2,2-difluoroethyl group or a 2,2,2-trifluoroethyl group, more preferably a methyl group, an ethyl group or a 2,2,2-trifluoroethyl group, further preferably a methyl group or an ethyl group.

The total number of carbon atoms in the compound (3) is preferably from 3 to 8, more preferably 3 to 6, further preferably from 3 to 5 since if it is too small, the boiling point tends to be too low, and if it is too large, the viscosity tends to be high. The molecular weight of the compound (3) is preferably from 100 to 300, more preferably from 100 to 250, particularly preferably from 100 to 200. Further, the fluorine content in the compound (3) is preferably at least 25 mass %, more preferably at least 30 mass %, since the non-flammability will be thereby improved.

Specific examples of the compound (3) may, for example, be (2,2,2-trifluoroethyl)acetate, methyl difluoroacetate, ethyl difluoroacetate, ethyl trifluoroacetate, etc. Among them, methyl difluoroacetate and ethyl trifluoroacetate are preferred, since they are excellent in availability and battery performance such as cycle properties.

As the fluorinated chain carboxylic acid ester compound, two or more types may be used in combination. In a case where two or more types of the fluorinated chain carboxylic acid ester compound, are to be used in combination, their ratio to one another may be optionally determined.

In a case where the liquid composition in the present invention contains the compound (3), the compound (3) to be contained, may be one type alone, or two or more types in combination.

As the fluorinated chain carboxylic acid ester compound contained in the liquid composition, at least a part thereof is preferably the compound (3), and more preferably, it is composed solely of the compound (3).

As the fluorinated chain carbonate compound, the following compound (4) is preferred.

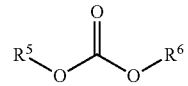
(4)

Here, in the formula (4), each of $R^5$ and $R^6$ which are independent of each other, is a $C_{1-3}$ alkyl group or a $C_{1-3}$ fluorinated alkyl group, and either one or each of $R^5$ and $R^6$ is a $C_{1-3}$ fluorinated alkyl group.

Each of the alkyl group and the fluorinated alkyl group may have a straight chain structure or a branched structure.

When either one or each of $R^5$ and $R^6$ is the fluorinated alkyl group, the solubility of the lithium salt in the non-aqueous electrolyte solution and the non-flammability are improved. $R^5$ and $R^6$ in the compound (4) may be the same or different.

The compound (4) is preferably a compound wherein each of $R^5$ and $R^6$ is a $C_{1-3}$ fluorinated alkyl group. The $C_{1-3}$ fluorinated alkyl group is preferably $CF_3CH_2$— or $CHF_2CF_2CH_2$—.

The total number of carbon atoms in the compound (4) is preferably from 4 to 10, more preferably from 4 to 7, since if it is too large, the viscosity tends to be high. The molecular weight of the compound (4) is preferably from 180 to 400, more preferably from 200 to 350, particularly preferably from 210 to 300. Further, the fluorine content in the compound (4) is preferably at least 25 mass %, more preferably at least 30 mass %, whereby the non-flammability will be improved.

Specific examples of the compound (4) may, for example, be bis(2,2,2-trifluoroethyl) carbonate, bis(2,2,3,3-tetrafluoropropyl) carbonate, etc. Among them, bis(2,2,2-trifluoroethyl) carbonate is preferred from the viewpoint of the viscosity, the availability and the battery performance such as output characteristics.

As the fluorinated chain carbonate compound, two or more types may be used in combination. In a case where two or more types of the fluorinated chain carbonate compound are to be used in combination, their ratio to one another may be optionally determined.

In a case where the liquid composition in the present invention contains the compound (4), the compound (4) to be contained, may be one type alone, or two or more types in combination.

As the fluorinated chain carbonate compound contained in the liquid composition, at least a part thereof is preferably the compound (4), and more preferably, it is composed solely of the compound (4).

The liquid composition in the present invention may contain a fluorinated alkane compound or the like as a fluorinated solvent other than the fluorinated solvent (α).

When the liquid composition in the present invention contains a fluorinated alkane compound, the non-aqueous electrolyte solution will have its vapor pressure suppressed and its non-flammability further improved. The fluorinated alkane compound is a compound having at least one hydrogen atom in an alkane substituted by a fluorine atom so that some hydrogen atoms still remain. As such a fluorinated alkane compound, a $C_{4-12}$ fluorinated alkane compound is preferred. In a case where a fluorinated alkane compound having at least 6 carbon atoms is used, the vapor pressure of the non-aqueous electrolyte solution will be low, and in the case of a fluorinated alkane compound having at most 12 carbon atoms, the solubility of the lithium salt will be good. Further, the fluorine content in the fluorinated alkane compound is preferably from 50 to 80 mass %. When the fluorine content in the fluorinated alkane compound is at least 50 mass %, the non-flammability will be excellent. When the fluorine content in the fluorinated alkane compound is at most 80 mass %, it is easy to maintain the solubility of the lithium salt.

As the fluorinated alkane compound, a compound having a straight chain structure is preferred, and for example, n-$C_4F_9CH_2CH_3$, n-$C_6F_{13}CH_2CH_3$, n-$C_6F_{13}H$ or n-$C_8F_{17}H$ may be mentioned. As such a fluorinated alkane compound, two or more types may be used in combination.

In a case where as the fluorinated solvent ($\alpha$), a fluorinated ether compound and at least one member selected from the group consisting of a fluorinated chain carboxylic acid ester compound, a fluorinated chain carbonate compound and a fluorinated alkane compound, are used in combination, their ratio to one another may be optionally determined.

The proportion of the mass of the fluorinated solvent ($\alpha$) to the total mass of the non-aqueous electrolyte solution of the present invention is from 40 to 80 mass %. The lower limit value of the proportion of the fluorinated solvent ($\alpha$) is preferably 45 mass %, more preferably 50 mass %, further preferably 55 mass %. Further, the upper limit value of the proportion of the fluorinated solvent ($\alpha$) is preferably 75 mass %, more preferably 73 mass %, further preferably 70 mass %.

When the proportion of the fluorinated solvent ($\alpha$) is at least the lower limit value, the non-aqueous electrolyte solution is excellent in non-flammability, has a low reactivity with a positive electrode and a negative electrode, is less susceptible to thermal runaway and has high voltage resistant characteristics. When the proportion of the fluorinated solvent ($\alpha$) is at most the upper limit value, the lithium salt is uniformly dissolved and is hardly precipitated at a low temperature, and the conductivity is hardly lowered.

The proportion of the mass of the fluorinated solvent ($\alpha$) to the total mass of the liquid composition is preferably from 45 to 90 mass %, more preferably from 50 to 85 mass %, further preferably from 55 to 80 mass %, particularly preferably from 60 to 75 mass %.

The liquid composition of the present invention preferably contains a fluorinated ether compound as the fluorinated solvent ($\alpha$).

The proportion of the mass of the fluorinated ether compound to the total mass of the fluorinated solvent ($\alpha$) is preferably from 25 to 100 mass %. The lower limit value of the proportion of the fluorinated ether compound is preferably 30 mass %, more preferably 50 mass %, further preferably 60 mass %, particularly preferably 70 mass %, most preferably 80 mass %. It is particularly preferred that the fluorinated solvent ($\alpha$) is composed solely of the fluorinated ether compound.

The proportion of the mass of the fluorinated ether compound to the total mass of the non-aqueous electrolyte solution of the present invention is preferably from 10 to 80 mass %. The lower limit value of the proportion of the fluorinated ether compound is more preferably 20 mass %, further preferably 30 mass %, particularly preferably 45 mass %, most preferably 50 mass %. Further, the upper limit value of the proportion of the fluorinated ether compound is more preferably 75 mass %, further preferably 73 mass %, particularly preferably 70 mass %.

In a case where the liquid composition in the present invention contains a fluorinated chain carboxylic acid ester compound as the fluorinated solvent ($\alpha$), the proportion of the mass of the fluorinated chain carboxylic acid ester compound to the total mass of the fluorinated solvent ($\alpha$) is preferably from 0.01 to 50 mass %. The upper limit value of the proportion of the fluorinated chain carboxylic acid ester compound is more preferably 40 mass %, further preferably 30 mass %, particularly preferably 20 mass %.

In a case where the liquid composition in the present invention contains a fluorinated chain carbonate compound as the fluorinated solvent ($\alpha$), the proportion of the mass of the fluorinated chain carbonate compound to the total mass of the fluorinated solvent ($\alpha$) is preferably from 0.01 to 50 mass %. The upper limit value of the proportion of the fluorinated chain carbonate compound is more preferably 40 mass %, further preferably 30 mass %, particularly preferably 20 mass %.

In a case where the liquid composition in the present invention contains a fluorinated alkane compound other than the fluorinated solvent ($\alpha$), the proportion of the mass of the fluorinated alkane compound to the total mass of the non-aqueous electrolyte solution is preferably from 0.01 to 5 mass %. When the proportion of the fluorinated alkane compound is at least 0.01 mass %, the vapor pressure is low, and the non-flammability is excellent. When the proportion of the fluorinated alkane compound is at most 5 mass %, the solubility of the lithium salt can easily be maintained.

Cyclic Carboxylic Acid Ester Compound

The liquid composition in the non-aqueous electrolyte solution of the present invention contains a cyclic carboxylic acid ester compound.

As the non-aqueous electrolyte solution of the present invention contains a cyclic carboxylic acid ester compound as a component of the liquid composition, by the cyclic carboxylic acid ester compound, the lithium salt is uniformly dissolved in the fluorinated solvent ($\alpha$). Further, in the present invention, by the use of the cyclic carboxylic acid ester compound, the non-aqueous electrolyte solution tends to be hardly reactive with a positive electrode and a negative electrode, and in a secondary cell, thermal runaway tends to hardly occur.

The cyclic carboxylic acid ester compound is a cyclic compound having an ester bond in its molecule, and is a compound having such a structure that a hydroxycarboxylic acid has undergone intramolecular dehydration cyclization.

The ring in the cyclic carboxylic acid ester compound is preferably a ring constituted by a total of at least 4 atoms including one oxygen atom, a carbon atom being adjacent to the oxygen atom and having an oxo group (=O) bonded thereto, and at least 2 carbon atoms connecting the oxygen atom and the carbon atom. The bivalent group constituted by at least 2 carbon atoms connecting the oxygen atom and the carbon atom having an oxo group (=O) bonded thereto, is preferably an alkylene group. Such an alkylene group is preferably a linear alkylene group, and the number of carbon atoms in the alkylene group is preferably from 2 to 8.

The cyclic carboxylic acid ester compound is preferably a saturated cyclic carboxylic acid ester compound containing no carbon-carbon unsaturated bond in its molecule.

The ring structure in the cyclic carboxylic acid ester compound is preferably a 4- to 10-membered ring, more preferably a 4- to 7-membered ring, and from the viewpoint of availability, a 5- or 6-membered ring is further preferred, and a 5-membered ring is particularly preferred.

The ring structure of the cyclic carboxylic acid ester compound is preferably a ring structure having one ester bond. Further, the cyclic ester compound may be a compound having at least one hydrogen atom of the above linear alkylene group substituted by a substituent. The substituent may, for example, be a fluorine atom, a chlorine atom, an alkyl group or a fluorinated alkyl group. The number of carbon atoms in the alkyl group is preferably 1 or 2, and the number of carbon atoms in the fluorinated alkyl group is preferably 1 or 2.

The cyclic carboxylic acid ester compound is preferably the following compound (5).

Here, in the formula (5), each of $R^7$ to $R^{12}$ which are independent of one another, is a hydrogen atom, a fluorine atom, a chlorine atom, a $C_{1-2}$ alkyl group, a $C_{1-2}$ fluorinated alkyl group or a $C_{2-3}$ alkyl group having at least one etheric oxygen atom, and n is an integer of from 1 to 3.

$R^7$ to $R^{12}$ in the compound (5) may be the same or different.

Each of $R^7$ to $R^{12}$ which are independent of one another, is preferably a hydrogen atom, a methyl group or a fluorine atom, and it is more preferred that all of $R^7$ to $R^{12}$ are hydrogen atoms, or form 1 to 3 of $R^7$ to $R^{12}$ are methyl groups, with the rest being hydrogen atoms.

n is preferably 1 or 2, more preferably 1.

The compound (5) may, for example, be a cyclic ester compound such as γ-butyrolactone, γ-valerolactone, γ-hexanolactone or δ-valerolactone, or a compound having at least one of hydrogen atoms bonded to carbon atoms constituting the ring of the cyclic ester compound, substituted by a fluorine atom, a chlorine atom, a $C_{1-2}$ alkyl group, a $C_{1-2}$ fluorinated alkyl group or a $C_{2-3}$ alkyl group having at least one etheric oxygen atom. Among them, γ-butyrolactone or γ-valerolactone is preferred, and γ-butyrolactone is more preferred, from the viewpoint of its availability and high effect to prevent thermal runaway.

The cyclic carboxylic acid ester compound contained in the liquid composition of the present invention may be one type only, or two or more types in combination.

Further, as the cyclic carboxylic acid ester compound contained in the liquid composition of the present invention, it is preferred that at least a part thereof is the compound (5), and it is more preferred that it is composed solely of the compound (5).

The proportion of the mass of the cyclic carboxylic acid ester compound to the total mass of the non-aqueous electrolyte solution of the present invention is preferably from 4 to 50 mass %, The lower limit value of the proportion of the cyclic carboxylic acid ester compound is more preferably 7 mass %, further preferably 10 mass %, particularly preferably 15 mass %. The upper limit value of the proportion of the cyclic carboxylic acid ester compound is more preferably 45 mass %, further preferably 40 mass %, particularly preferably 35 mass %.

When the proportion of the cyclic carboxylic acid ester compound is at least the lower limit value, the non-aqueous electrolyte solution dissolves the lithium salt uniformly, and the reactivity of the non-aqueous electrolyte solution with a positive electrode and a negative electrode is small, whereby thermal runaway tends to be less likely to occur. Further, when the content of the cyclic carboxylic acid ester compound is at most the upper limit value, the non-aqueous electrolyte solution is excellent in non-flammability.

$N_A/N_{Li}$ i.e. the ratio of the total number of moles ($N_A$) of the cyclic carboxylic acid ester compound to the total number of moles ($N_{Li}$) of lithium atoms derived from the lithium salt, contained in the non-aqueous electrolyte solution, is from 1.5 to 7.0.

The lower limit value of $N_A/N_{Li}$ is preferably 2.0, more preferably 2.5, further preferably 3.0.

In a case where the non-aqueous electrolyte solution of the present invention is used for a secondary battery, particularly at its positive electrode, the cyclic carboxylic acid ester compound forms a stable coating film on the electrode active material during its use, and it is considered that the reaction between the electrode and the non-aqueous electrolyte solution is suppressed by the coating film, and thermal runaway is thereby prevented.

It is considered that when $N_A/N_{Li}$ is at least the lower limit value, the cyclic carboxylic acid ester compound to form the coating film is sufficiently contained in the non-aqueous electrolyte solution, whereby the coating film is sufficiently formed, so that the reaction between the electrode and the non-aqueous electrolyte solution is sufficiently suppressed, and a sufficient effect to prevent thermal runaway is obtainable. Further, the cyclic carboxylic acid ester compound is considered to have a high affinity to the lithium salt and thus accelerate dissolution of the lithium salt in the solvent, and accordingly, when $N_A/N_{Li}$ is at least the lower limit value, the lithium salt tends to be sufficiently soluble in the solvent, and it tends to be easy to obtain an electrolyte solution having a practically sufficient conductivity. Here, the fluorinated compound such as the fluorinated ether compound, the fluorinated chain carboxylic acid ester compound or the fluorinated chain carbonate compound is considered to have a low affinity to the lithium salt, whereby its effect to accelerate dissolution of the lithium salt in the solvent tends to be very small.

Further, the upper limit value of $N_A/N_{Li}$ is preferably 6.5, more preferably 6.0, further preferably 5.5, particularly preferably 5.0, further preferably 4.5, most preferably 4.2.

The coating film formed on the electrode active material is considered to be readily soluble in a highly polar solvent, and it is conceivable that in a highly polar solvent, even if a coating film is formed, it will be dissolved, whereby formation of a coating film tends to be inadequate. When $N_A/N_{Li}$ is at most the upper limit value, the content of the cyclic carboxylic acid ester compound in the non-aqueous electrolyte solution will not be too high, and the polarity of the entire electrolyte solution will be within a proper range, whereby dissolution of the coating film formed on the electrode active material is considered to be less likely to occur. It is considered that as the sufficient coating film is maintained on the electrode active material, a heat generation reaction between the electrode and the non-aqueous electrolyte solution tends to be less likely to occur, whereby thermal runaway also tends to be less likely to occur. Here, the fluorinated compound such as the fluorinated ether compound, the fluorinated chain carboxylic acid ester compound or the fluorinated chain carbonate compound has a low polarity, whereby the effect to dissolve the coating film is considered to be very low. Further, as the content of the highly flammable cyclic carboxylic acid ester becomes small, the non-flammability of the non-aqueous electrolyte solution will also be improved.

When $N_A/N_{Li}$ is within the above range, it is possible to uniformly dissolve the lithium salt to obtain a sufficient conductivity and at the same time, it is possible to reduce the reactivity of the non-aqueous electrolyte solution with the positive electrode and the negative electrode thereby to prevent thermal runaway of the secondary battery from taking place.

Non-Fluorinated Unsaturated Cyclic Carbonate Compound

The liquid composition in the non-aqueous electrolyte solution of the present invention preferably further contains a non-fluorinated unsaturated cyclic carbonate compound.

By the non-fluorinated unsaturated cyclic carbonate compound, the non-aqueous electrolyte solution will be excellent in rate properties, initial charge/discharge properties and cycle properties.

The non-fluorinated unsaturated cyclic carbonate compound is a compound having a ring structure constituted by carbon atoms and oxygen atoms wherein the ring structure has a carbonate bond, and is a compound having a carbon-carbon unsaturated bond in its molecule and having no fluorine atom.

The ring in the non-fluorinated unsaturated cyclic carbonate compound is preferably a ring constituted by a total of at least 4 atoms including a carbon atom having an oxo group (=O) bonded thereto, 2 oxygen atoms bonded to the carbon atom and at least one carbon atom connecting the 2 oxygen atoms. The bivalent group connecting the 2 oxygen atoms is preferably an alkenylene group or an alkylene group. Such a bivalent group is preferably a chain alkenylene group or a chain alkylene group. Further, the number of carbon atoms of the chain alkenylene group is preferably from 2 to 7, more preferably from 2 to 4. The number of carbon atoms of the chain alkylene group is preferably from 1 to 7, more preferably from 2 to 4.

The ring structure of the non-fluorinated unsaturated cyclic carbonate compound is preferably a 4- to 10-membered ring, more preferably a 4- to 7-membered ring, and from the viewpoint of availability, a 5- or 6-membered ring is further preferred, and a 5-membered ring is particularly preferred.

The ring structure of the non-fluorinated unsaturated cyclic carbonate compound is preferably a ring structure having one carbonate bond.

The carbon-carbon unsaturated bond of the non-fluorinated unsaturated cyclic carbonate compound may be present in the ring structure or outside the ring structure. The number of carbon-carbon unsaturated bonds in the non-fluorinated unsaturated cyclic carbonate compound is preferably from 1 to 5, more preferably from 1 to 3, and from the viewpoint of availability and the durability of the non-aqueous electrolyte solution, 1 or 2 is further preferred, and 1 is particularly preferred.

The non-fluorinated unsaturated cyclic carbonate compound is preferably the following compound (6) or compound (7).

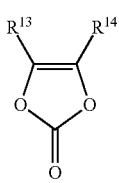

(6)

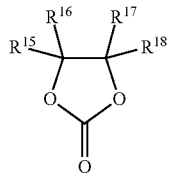

(7)

Here, in the formula (6), each of $R^{13}$ and $R^{14}$ which are independent of each other, is a hydrogen atom or a $C_{1-3}$ alkyl group.

Further, in the formula (7), each of $R^{15}$ to $R^{18}$ which are independent from one another, is a hydrogen atom, a $C_{1-3}$ alkyl group, a vinyl group or an allyl group, provided that at least one of $R^{15}$ to $R^{18}$ is a vinyl group or an allyl group.

The compound (6) may, for example, be 4,5-dimethyl vinylene carbonate or vinylene carbonate. Among them, vinylene carbonate is preferred.

The compound (7) may, for example, be vinyl ethylene carbonate (another name: 4-vinyl-1,3-dioxolan-2-one), 3-methyl-4-vinyl ethylene carbonate, 4,5-divinyl ethylene carbonate or 4,5-bis(2-methyl vinyl)ethylene carbonate. Among them, vinyl ethylene carbonate is preferred.

As the non-fluorinated unsaturated cyclic carbonate compound, it is preferred to use the compound (6), the compound (7) or a mixture of the compounds (6) and (7), and it is more preferred to use the compound (6) alone or the compound (7) alone. As the non-fluorinated unsaturated cyclic carbonate compound contained in the liquid composition of the present invention, it is preferred that at least a part thereof is the compound (6), and it is more preferred that it is composed solely of the compound (6).

The content of the non-fluorinated unsaturated cyclic carbonate compound in the non-aqueous electrolyte solution of the present invention, is preferably from 0.01 to 10 mass %. The lower limit value of the content of the non-fluorinated unsaturated cyclic carbonate compound is more preferably 0.1 mass %, further preferably 0.2 mass %, particularly preferably 0.5 mass %. The upper limit value of the content of the non-fluorinated unsaturated cyclic carbonate compound is more preferably 7 mass %, further preferably 5 mass %, particularly preferably 3 mass %.

When the content of the non-fluorinated unsaturated cyclic carbonate compound is at least the lower limit value, the non-aqueous electrolyte solution will be excellent in cycle properties, initial charge/discharge properties and rate properties. Further, when the content of the non-fluorinated unsaturated cyclic carbonate compound is at most the upper limit value, the non-aqueous electrolyte solution will be excellent in non-flammability and voltage resistance, and the reactivity of the non-aqueous electrolyte solution with the positive electrode and the negative electrode will be small, whereby thermal runaway tends to be less likely to occur.

Fluorinated Cyclic Carbonate Compound

It is also preferred that the liquid composition in the non-aqueous electrolyte solution of the present invention further contains a fluorinated cyclic carbonate compound.

By the fluorinated cyclic carbonate compound, the non-aqueous electrolyte solution will be excellent in rate properties, initial charge/discharge properties and cycle properties.

The fluorinated cyclic carbonate compound is a compound having a ring structure constituted by carbon atoms and oxygen atoms wherein the ring structure has a carbonate bond, and is a compound containing fluorine atoms in its molecule.

The ring in the fluorinated cyclic carbonate compound is preferably a ring constituted by a total of at least 4 atoms including a carbon atom having an oxo group (=O) bonded thereto, 2 oxygen atoms bonded to the carbon atom and at least one carbon atom connecting the 2 oxygen atoms. The bivalent group connecting the 2 oxygen atoms is preferably an alkenylene group or an alkylene group. Such a bivalent group is preferably a chain alkylene group or a chain alkenylene group. Further, number of carbon atoms of the chain alkylene group is preferably from 1 to 7, more preferably from 2 to 4. The number of carbon atoms of the chain alkenylene group is preferably from 2 to 7, more preferably from 2 to 4. In the fluorinated cyclic carbonate compound, such a chain alkylene group or a chain alkenylene group has fluorine atoms or a fluorinated substituent such as a fluorinated alkyl group.

The fluorinated cyclic carbonate compound is preferably a compound containing no carbon-carbon unsaturated bond in its molecule.

The ring structure in the fluorinated cyclic carbonate compound is preferably a 4- to 10-membered ring, more preferably a 4- to 7-membered ring, and from the viewpoint of availability, a 5- or 6-membered ring is further preferred, and a 5-membered ring is particularly preferred.

The ring structure of the fluorinated cyclic carbonate compound is preferably a ring structure having one carbonate bond, more preferably a ring structure having the carbonate bond formed as connected to a fluorinated linear alkylene group. The fluorinated linear alkylene group is a group having at least one of hydrogen atoms in a linear alkylene group substituted by a fluorine atom. The number of carbon atoms in the fluorinated linear alkylene group is preferably from 1 to 7, more preferably from 1 to 4, further preferably 2 or 3, particularly preferably 2.

Further, as the fluorinated cyclic carbonate compound, a compound having at least one of hydrogen atoms in a linear alkylene group substituted by a fluorinated alkyl group, is also preferred.

The fluorinated cyclic carbonate compound is preferably the following compound (8).

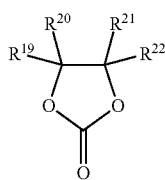

(8)

Here, in the formula (8), each of $R^{19}$ to $R^{22}$ which are independent of one another, is a hydrogen atom, a fluorine atom, a $C_{1-4}$ alkyl group, a $C_{2-4}$ alkyl group having an etheric oxygen atom, a $C_{1-4}$ fluorinated alkyl group or a $C_{2-4}$ fluorinated alkyl group having an etheric oxygen atom, provided that at least one of $R^{19}$ to $R^{22}$ is a $C_{1-4}$ fluorinated alkyl group or a $C_{2-4}$ fluorinated alkyl group having an etheric oxygen atom.

$R^{19}$ to $R^{22}$ in the compound (8) may be the same or different.

Each of $R^{19}$ to $R^{22}$ is preferably a hydrogen atom, a fluorine atom, a $C_{1-4}$ fluorinated alkyl group or a $C_{1-4}$ fluorinated alkyl group having an etheric oxygen atom, more preferably a hydrogen atom, a fluorine atom, —$CF_3$, —$CHF_2$, —$CH_2F$, —$CF_2CF_3$, —$CH_2CF_3$ or —$CH_2OCH_2CF_2CF_3$. From the viewpoint of e.g. availability, it is further preferred that at least some of $R^{19}$ to $R^{22}$ are fluorine atoms or —$CF_3$, with the rest being hydrogen atoms, and it is particularly preferred that some of $R^{19}$ to $R^{22}$ are fluorine atoms, with the rest being hydrogen atoms.

From the viewpoint of excellent rate properties and cycle properties, the compound (8) is preferably the following compound (8-1) to (8-7), and from the viewpoint of e.g. availability, the compound (8-1) or the compound (8-4) is more preferred, and the compound (8-1) is further preferred.

(8-1)

(8-2)

(8-3)

(8-4)

(8-5)

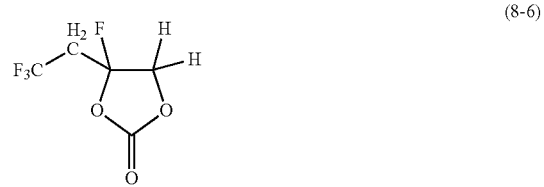

(8-6)

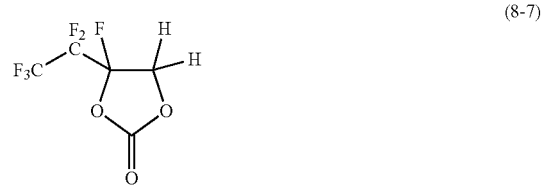

(8-7)

As a specific example of the compound (8) other than the compounds (8-1) to (8-7), the following compound (8-8) may, for example, be mentioned.

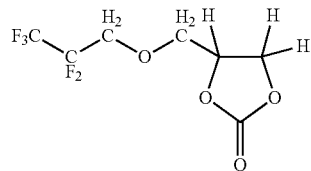

(8-8)

The fluorinated cyclic carbonate compound contained in the liquid composition in the present invention may be one type only, or two or more types in combination.

Further, as the fluorinated cyclic carbonate compound contained in the liquid composition, it is preferred that at least a part thereof is the compound (8), and it is more preferred that it is composed solely of the compound (8).

The content of the fluorinated cyclic carbonate compound in the non-aqueous electrolyte solution of the present invention, is preferably from 0.01 to 10 mass %. The lower limit value of the content of the fluorinated cyclic carbonate compound is more preferably 0.1 mass %, further preferably 0.2 mass %, particularly preferably 0.5 mass %. The upper limit value of the content of the fluorinated cyclic carbonate compound is more preferably 7 mass %, further preferably 5 mass %, particularly preferably 3 mass %.

When the content of the fluorinated cyclic carbonate compound is at least the lower limit value, the non-aqueous electrolyte solution will be excellent in cycle properties, initial charge/discharge properties and rate properties. Further, when the content of the fluorinated cyclic carbonate compound is at most the upper limit value, the non-aqueous electrolyte solution will be excellent in non-flammability and voltage resistance, and the reactivity of the non-aqueous electrolyte solution with the positive electrode and the negative electrode will be small, whereby thermal runaway tends to be less likely to occur.

Other Solvent

The liquid composition in the non-aqueous electrolyte solution of the present invention may contain a solvent other than the above fluorinated solvent (α), fluorinated cyclic carboxylic acid ester compound, non-fluorinated unsaturated cyclic carbonate compound and fluorinated cyclic carbonate compound. Such other solvent is preferably at least one compound (β) selected from the group consisting of a saturated cyclic carbonate compound having no fluorine atom (hereinafter referred to as a "non-fluorinated saturated cyclic carbonate compound"), a chain carbonate compound having no fluorine atom (hereinafter referred to as a "non-fluorinated chain carbonate compound"), a saturated cyclic sulfone compound and a phosphoric acid ester compound, since the non-aqueous electrolyte solution is thereby excellent in the solubility of the lithium salt and the conductivity.

The non-fluorinated saturated cyclic carbonate compound is a compound having a ring structure wherein the ring skeleton is constituted by carbon atoms and oxygen atoms and is a compound wherein the ring structure has a carbonate bond represented by —O—C(=O)—O— and has no fluorine atom or no carbon-carbon unsaturated bond. For example, propylene carbonate (PC) or ethylene carbonate (EC) may be mentioned.

The non-fluorinated chain carbonate compound is a chain compound which has no ring structure, has a carbonate bond represented by —O—C(=O)—O— and has no fluorine atom. For example, dimethyl carbonate (DMC), ethylmethyl carbonate (EMC) or diethyl carbonate (DEC) may be mentioned.

The saturated cyclic sulfone compound may, for example, be sulfolane or 3-methylsulfolane.

The phosphoric acid ester compound may, for example, be a trimethyl phosphate or triethyl phosphate.

The non-aqueous electrolyte solution of the present invention may not contain other solvent, but in a case where it contains other solvent, the proportion of the mass of other solvent to the total mass of the non-aqueous electrolyte solution is preferably from 0.01 to 30 mass %, more preferably from 0.1 to 20 mass %. When the proportion of such other solvent is at most the upper limit value, the reaction of such other solvent with the charging electrode can easily be prevented, and it is possible to obtain an electrolyte solution excellent in stability. Further, the content of the fluorinated solvent (α) can thereby be made large, whereby it is readily possible to obtain a non-aqueous electrolyte solution excellent in non-flammability.

In a case where the non-aqueous electrolyte solution of the present invention contains the compound (β), the proportion of the mass of the compound (β) to the total mass of the non-aqueous electrolyte solution is preferably from 0.01 to 30 mass %, more preferably from 0.1 to 20 mass %.

The non-aqueous electrolyte solution of the present invention may not contain the non-fluorinated saturated cyclic carbonate compound, but in a case where it contains the non-fluorinated saturated cyclic carbonate compound, the proportion of the mass of the non-fluorinated saturated cyclic carbonate compound to the total mass of the non-aqueous electrolyte solution is preferably at most 20 mass %, more preferably at most 15 mass %, further preferably less than 10 mass %, particularly preferably at most 5 mass %, most preferably at most 3 mass %.

In a case where the non-aqueous electrolyte solution of the present invention contains the non-fluorinated saturated cyclic carbonate compound, the proportion of the mass of the non-fluorinated saturated cyclic carbonate compound to the total mass of the non-aqueous electrolyte solution, is preferably from 0.01 to 20 mass %, more preferably from 0.01 to 15 mass %, further preferably at least 0.01 mass % and less than 10 mass %, particularly preferably from 0.01 to 5 mass %, most preferably from 0.01 to 3 mass %. When the proportion of the non-fluorinated saturated cyclic carbonate compound is at most the upper limit value, the non-fluorinated saturated cyclic carbonate compound is less likely to react with the electrodes, and the non-aqueous electrolyte solution will be excellent in stability and excellent in non-flammability.

The non-aqueous electrolyte solution of the present invention may not contain the non-fluorinated chain carbonate compound, but when it contains the non-fluorinated chain carbonate compound, the viscosity of the electrolyte solution can be lowered, and the conductivity of the electrolyte solution can be readily made to be high, and therefore, it is also preferred that the non-aqueous electrolyte solution contains the non-fluorinated chain carbonate compound.

In a case where the non-aqueous electrolyte solution contains the non-fluorinated chain carbonate compound, the proportion of the mass of the non-fluorinated chain carbonate compound to the total mass of the non-aqueous electrolyte solution is preferably at most 30 mass %, more preferably at most 20 mass %, further preferably at most 15 mass %, particularly preferably less than 10 mass %, most preferably at most 5 mass %.

In a case where the non-aqueous electrolyte solution contains the non-fluorinated chain carbonate compound, the proportion of the mass of the non-fluorinated chain carbonate compound to the total mass of the non-aqueous electrolyte solution is preferably from 0.01 to 30 mass %, more preferably from 0.01 to 20 mass %, further preferably from 0.01 to 15 mass %, particularly preferably at least 0.01 mass % and less than 10 mass %, most preferably from 0.01 to 5 mass %, for the same reason as in the case of the non-fluorinated saturated cyclic carbonate compound.

The proportion of the total mass of the non-fluorinated chain carbonate compound and the non-fluorinated saturated cyclic carbonate compound to the total mass of the non-aqueous electrolyte solution of the present invention is preferably at most 20 mass %, more preferably at most 15 mass %, further preferably less than 10 mass %, particularly preferably at most 5 mass %.

In a case where the non-aqueous electrolyte solution of the present invention contains at least one member selected from the group consisting of the non-fluorinated saturated cyclic carbonate compound and the non-fluorinated chain carbonate compound, the proportion of the total mass of the non-fluorinated saturated cyclic carbonate compound and the non-fluorinated chain carbonate compound to the total mass of the non-aqueous electrolyte solution is preferably from 0.01 to 20 mass %, more preferably from 0.01 to 15 mass %, further preferably at least 0.01 mass % and less than 10 mass %, particularly preferably from 0.01 to 5 mass %.

When the proportion of the total mass is at most the upper limit value, even when the non-fluorinated saturated cyclic carbonate compound and the non-fluorinated chain carbonate compound are used, it is possible to prevent dissolution of a coating film formed by the cyclic carboxylic acid ester due to the above-mentioned increase of the polarity of the solvent, and to control their reactivity with the electrodes to be low, whereby it is readily possible to make the non-aqueous electrolyte solution excellent in stability. Further, by controlling the content of flammable compounds to be low, it is readily possible to make the non-aqueous electrolyte solution excellent in non-flammability.

The non-aqueous electrolyte solution of the present invention may not contain the saturated cyclic sulfone compound, but in a case where it contains the saturated cyclic sulfone compound, the proportion of the mass of the saturated cyclic sulfone compound to the total mass of the non-aqueous electrolyte solution is preferably at most 20 mass %, more preferably at most 15 mass %, particularly preferably at most 10 mass %, most preferably at most 5 mass %.

In a case where the non-aqueous electrolyte solution of the present invention contains the saturated cyclic sulfone compound, the proportion of the mass of the saturated cyclic sulfone compound to the total mass of the non-aqueous electrolyte solution is preferably from 0.01 to 20 mass %, more preferably from 0.01 to 15 mass %, further preferably from 0.01 to 10 mass %, particularly preferably from 0.01 to 5 mass %, for the same reason as in the case of the non-fluorinated saturated cyclic carbonate compound.

The non-aqueous electrolyte solution of the present invention may not contain the phosphoric acid ester compound, but in a case where it contains the phosphoric acid ester compound, the proportion of the mass of the phosphoric acid ester compound to the total mass of the non-aqueous electrolyte solution is preferably at most 5 mass %.

In a case where the non-aqueous electrolyte solution of the present invention contains the phosphoric acid ester compound, the proportion of the mass of the phosphoric acid ester compound to the total mass of the non-aqueous electrolyte solution of the present invention is preferably from 0.01 to 5 mass %, for the same reason as in the case of the non-fluorinated saturated cyclic carbonate compound.

Further, in a case where the non-aqueous electrolyte solution of the present invention contains the phosphoric acid ester compound, $N_P/N_{Li}$ i.e. the ratio of the total number of moles ($N_P$) of the phosphoric acid ester compound to the total number of moles ($N_{Li}$) of lithium atoms derived from the lithium salt, is preferably at least 0.01 and less than 1.0.

Further, the proportion of the mass of the cyclic carboxylic acid ester compound to the total mass of the cyclic carboxylic acid ester compound and the compound (β) is preferably from 40 to 100 mass %. The lower limit value of the proportion of the cyclic carboxylic acid ester compound is preferably 50 mass %, more preferably 60 mass %, further preferably 70 mass %, particularly preferably 80 mass %.

Further, in a case where the non-aqueous electrolyte solution of the present invention contains the compound (β), $(N_A+N_B)/N_{Li}$ i.e. the ratio of the sum of the total number of moles ($N_A$) of the cyclic carboxylic acid ester compound and the total number of moles ($N_B$) of the compound (β) to the total number of moles ($N_{Li}$) of lithium atoms derived from the lithium salt, is from 3 to 7.0, but the lower limit is preferably 3.0. Further, the upper limit is preferably 6.5. $(N_A+N_B)/N_{Li}$ is particularly preferably from 3 to 6.5.

The lower limit value of $(N_A+N_B)/N_{Li}$ is preferably 3.2, more preferably 3.5.

The compound (β) has a high affinity to the lithium salt like the cyclic carboxylic acid ester compound and is thus considered to have an effect to accelerate dissolution of the lithium salt in the solvent. When $(N_A+N_B)/N_{Li}$ is at least the lower limit value i.e. when the total amount of the cyclic carboxylic acid ester compound and the compound (β) which are considered to have high effects to accelerate dissolution of the lithium salt, is at least at a certain level to the amount of the lithium salt, the solubility of the lithium salt to the fluorinated solvent (α) will be improved, whereby the conductivity of the non-aqueous electrolyte solution will be improved, so that even when a lithium salt such as $LiPF_6$ which is usually hardly soluble in a fluorinated solvent, is used, it can be dissolved in a fluorinated solvent, and a practically sufficient conductivity is readily obtainable.

Further, the upper limit value of $(N_A+N_B)/N_{Li}$ is preferably 6.5, more preferably 6.0, further preferably 5.5, particularly preferably 5.0, most preferably 4.5.

As mentioned above, if the polarity of a solvent is high, a coating film made of the cyclic carboxylic acid ester compound formed on the electrode active material tends to be dissolved and formation of a coating film tends to be inadequate. The compound (β) also has a high polarity and is thus considered to exhibit an effect to dissolve the coating film. When $(N_A+N_B)/N_{Li}$ is at most the upper limit value i.e. when the total amount of the cyclic carboxylic acid ester compound and the compound (β) which exhibit an effect to dissolve the coating film, is at most at a certain level to the lithium salt, the solubility of the coating film is considered to be low, and it is less likely that formation of the coating film becomes inadequate. It is considered that consequently, the reactivity of the non-aqueous electrolyte solution with the positive electrode and the negative electrode tends to be less, and thermal runaway of the secondary battery tends to be less likely to occur. Further, as the content of the highly flammable cyclic carboxylic acid ester compound and compound (β) in the non-aqueous electrolyte solution becomes small, the non-flammability of the non-aqueous electrolyte solution will be improved.

Particularly, by using a lithium salt containing $LiPF_6$ and adjusting $N_A/N_{Li}$ and $(N_A+N_B)/N_{Li}$ to the above ranges, it is readily possible to obtain a non-aqueous electrolyte solution which is provided with both practically sufficient conductivity and excellent stability to avoid thermal runaway.

Further, in the present invention, it is preferred that the liquid composition in the present invention does not contain a nitrile compound such as acetonitrile and an ether compound having no fluorine atom such as monoglyme (1,2-dimethoxyethane), so that it is thereby readily possible to obtain a non-aqueous electrolyte solution which has a lower reactivity with the positive electrode and the negative electrode and which is less likely to be susceptible to thermal runaway.

In a case where the liquid composition contains a nitrile compound, the proportion of the mass of the nitrile compound to the total mass of the non-aqueous electrolyte solution of the present invention is preferably at most 10 mass %, preferably at most 5 mass %, further preferably at most 3 mass %.

In a case where the liquid composition contains an ether compound having no fluorine atom, the proportion of the mass of the ether compound having no fluorine atom to the total mass of the non-aqueous electrolyte solution of the present invention is preferably at most 10 mass %, preferably at most 5 mass %, further preferably at most 3 mass %, particularly preferably at most 1 mass %.

Other Components

To the non-aqueous electrolyte solution of the present invention, components other than those described above may be incorporated as the case requires, in order to improve the functions of the non-aqueous electrolyte solution. Such other components may, for example, be a conventional overcharge-preventing agent, a dehydrating agent, a deoxidizing agent, a property-improving adjuvant to improve cycle properties or capacity-maintaining properties after storage at a high temperature, a surfactant to assist impregnation of the non-aqueous electrolyte solution to the electrode material and the separator, etc.

The overcharge-preventing agent may, for example, be an aromatic compound such as biphenyl, an alkylbiphenyl, terphenyl, partially hydrogenated terphenyl, cyclohexylbenzene, t-butylbenzene, t-amylbenzene, diphenyl ether or dibenzofuran; a partially fluorinated product of the above aromatic compound, such as 2-fluorobiphenyl, o-cyclohexylfluorobenzene or p-cyclohexylfluorobenzene; or a fluorinated anisole compound such as 2,4-difluoroanisole, 2,5-difluoroanisole or 2,6-difluoroanisole. Such overcharge-preventing agents may be used alone or in combination as a mixture of two or more of them.

In a case where the non-aqueous electrolyte solution contains an overcharge-preventing agent, the content of the overcharge-preventing agent in the non-aqueous electrolyte solution is preferably from 0.01 to 5 mass %. By incorporating at least 0.01 mass % of the overcharge-preventing agent in the non-aqueous electrolyte solution, it becomes easier to prevent breakage or ignition of a secondary battery by overcharge, and it is possible to use the secondary battery more stably.

The dehydrating agent may, for example, be molecular sieves, salt cake, magnesium sulfate, calcium hydrate, sodium hydrate, potassium hydrate or lithium aluminum hydrate. As the solvent to be used for the non-aqueous electrolyte solution of the present invention, it is preferred to use one subjected to dehydration by the above dehydrating agent, followed by rectification. Otherwise, a solvent subjected to dehydration by the above dehydrating agent without rectification may be used.

The property-improvement adjuvant to improve the cycle properties or the capacity-maintaining properties after storage at a high temperature, may be a carbonate compound other than the above-described components (i.e. the fluorinated compound (α), the compound (β), the unsaturated cyclic carbonate compound having no fluorine atom, and the fluorinated cyclic carbonate compound) or a sulfone compound other than the above-described compound (β).

Specifically, it may, for example, be a carbonate compound other than those mentioned above, such as erythritan carbonate or spiro-bis-dimethylene carbonate; a sulfur-containing compound such as ethylene sulfite, 1,3-propanesultone, 1,4-butanesultone, methyl methanesulfonate, busulfan, sulfolene, dimethylsulfone, diphenylsulfone, methylphenylsulfone, dibutyldisulfide, dicyclohexyldisulfide, tetramethylthiuram monosulfide, N,N-dimethylmethane sulfonamide or N,N-diethylmethane sulfonamide; a hydrocarbon compound such as heptane, octane or cycloheptane; or a fluorinated aromatic compound such as fluorobenzene, difluorobenzene or hexafluorobenzene. These property-improving adjuvants may be used alone or in combination as a mixture of two or more of them.

In a case where the non-aqueous electrolyte solution contains a property-improving adjuvant, the content of the property-improving adjuvant in the non-aqueous electrolyte solution is preferably from 0.01 to 5 mass %.

The surfactant may be any one of a cationic surfactant, an anionic surfactant, a non-ionic surfactant and an amphoteric surfactant. From the viewpoint of availability and high surface active effects, an anionic surfactant is preferred. Further, the surfactant is preferably a fluorinated surfactant, since the oxidation resistance is high and the cycle properties and rate properties will be thereby excellent.

As an anionic fluorinated surfactant, the following compounds (9-1) and (9-2) are preferred.

  (9-1)

  (9-2)

Here, in the formulae, each of $R^{23}$ and $R^{24}$ which are independent of each other, is a $C_{4-20}$ perfluoroalkyl group or a $C_{4-20}$ perfluoroalkyl group having at least one etheric oxygen atom.

Each of $M^1$ and $M^2$ which are independent of each other, is an alkali metal or $NH(R^{25})_3$ (wherein $R^{25}$ is a hydrogen atom or a $C_{1-8}$ alkyl group, provided that the plurality of $R^{25}$ may be the same or different).

As $R^{23}$ and $R^{24}$, a $C_{4-20}$ perfluoroalkyl group or a $C_{4-20}$ perfluoroalkyl group having at least one etheric oxygen atom is preferred in that the degree for lowering the surface tension of the non-aqueous electrolyte solution is thereby good, and a $C_{4-8}$ perfluoroalkyl group or a $C_{4-8}$ perfluoroalkyl group having at least one etheric oxygen atom is more preferred from the viewpoint of the solubility and environmental burden.

The structure of $R^{23}$ and $R^{24}$ may be a straight chain structure or a branched structure and may contain a ring structure. From the viewpoint of availability and good surface active effects, the structure of $R^{23}$ and $R^{24}$ is preferably a straight chain structure.

As the alkali metal for $M^1$ and $M^2$, Li, Na or K is preferred. As $M^1$ and $M^2$, $NH_4^+$ is particularly preferred.

Specific example of the compound (9-1) include, for example, fluorinated carboxylic acid salts such as $C_4F_9COO^-NH_4^+$, $C_5F_{11}COO^-NH_4^+$, $C_6F_{13}COO^-NH_4^+$, $C_5F_{11}COO^-$ $NH(CH_3)_3^+$, $C_6F_{13}COO^-NH(CH_3)_3^+$, $C_4F_9COO^-Li^+$, $C_5F_{11}COO^-Li^+$, $C_6F_{13}COO^-Li^+$, $C_3F_7OCF(CF_3)COO^-NH_4^+$, $C_3F_7OCF(CF_3)CF_2OCF_2(CF_3)COO^-NH_4^+$, $C_3F_7OCF(CF_3)COO^-NH(CH_3)_3^+$, $C_3F_7OCF(CF_3)CF_2OCF(CF_3)COO^-NH(CH_3)_3^+$, $C_3F_7OCF(CF_3)COO^-Li^+$, $C_2F_5OC_2F_4OCF_2COO^-Li^+$, $C_2F_5OC_2F_4OCF_2COO^-NH_4^+$, $C_3F_7OCF(CF_3)CF_2OCF(CF_3)COO^-Li^+$, etc.

Among them, from the viewpoint of the solubility in the non-aqueous electrolyte solution and good effects to lower the surface tension, $C_5F_{11}COO^-NH_4^+$, $C_5F_{11}COO^-Li^+$, $C_6F_{13}COO^-Li^+$, $C_3F_7OCF(CF_3)COO^-NH_4^+$, $C_3F_7OCF(CF_3)CF_2OCF_2(CF_3)COO^-NH_4^+$, $C_3F_7OCF(CF_3)COO^-Li^+$, $C_3F_7OCF(CF_3)CF_2OCF(CF_3)COO^-Li^+$, $C_2F_5OC_2F_4OCF_2COO^-Li^+$ and $C_2F_5OC_2F_4OCF_2COO^-NH_4^+$ are preferred.

Specific examples of the compound (9-2) include, for example, fluorinated sulfonic acid salts such as $C_4F_9SO_3^-NH_4^+$, $C_5F_{11}SO_3^-NH_4^+$, $C_6F_{13}SO_3^-NH_4^+$, $C_4F_9SO_3^-NH(CH_3)_3^+$, $C_5F_{11}SO_3^-NH(CH_3)_3^+$, $C_6F_{13}SO_3^-NH(CH_3)_3^+$, $C_4F_9SO_3^-Li^+$, $C_5F_{11}SO_3^-Li^+$, $C_6F_{13}SO_3^-Li^+$, $C_3F_7OCF(CF_3)CF_2OC(CF_3)FSO_3^-NH_4^+$, $C_3F_7OCF(CF_3)CF_2OCF(CF_3)CF_2OCF(CF_3)SO_3^-NH_4^+$, $HCF_2CF_2OCF_2CF_2SO_3^-NH_4^+$, $CF_3CFHCF_2OCF_2CF_2SO_3^-NH_4^+$, $C_3F_7OC(CF_3)FSO_3^-NH_4^+$, $C_3F_7OCF(CF_3)CF_2OC(CF_3)FSO_3^-NH(CH_3)_3^+$, $C_3F_7OCF(CF_3)CF_2OCF(CF_3)CF_2OCF(CF_3)SO_3^-NH(CH_3)_3^+$, $HCF_2CF_2OCF_2CF_2SO_3^-NH(CH_3)_3^+$, $CF_3CFHCF_2OCF_2CF_2SO_3^-NH(CH_3)_3^+$, $C_3F_7OCF(CF_3)SO_3^-NH(CH_3)_3^+$, $C_3F_7OCF(CF_3)CF_2OC(CF_3)FSO_3^-Li^+$, $C_3F_7OCF(CF_3)CF_2OC(CF_3)FCF_2OCF(CF_3)SO_3^-Li^+$, $HCF_2CF_2OCF_2CF_2SO_3^-Li^+$, $CF_3CFHCF_2OCF_2CF_2SO_3^-Li^+$, $C_3F_7OCF(CF_3)SO_3^-Li^+$, etc.

Among them, from the viewpoint of the solubility in the non-aqueous electrolyte solution and good effects to lower the surface tension, $C_4F_9SO_3^-NH_4^+$, $C_6F_{13}SO_3^-NH_4^+$, $C_4F_9SO_3^-Li^+$, $C_6F_{13}SO_3^-Li^+$, $C_8F_{17}SO_3^-Li^+$, $C_3F_7OCF(CF_3)CF_2OCF(CF_3)SO_3^-NH_4^+$, $C_3F_7OCF(CF_3)CF_2OCF(CF_3)SO_3^-Li^+$, $C_3F_7OCF(CF_3)SO_3^-NH_4^+$ and $C_3F_7OCF(CF_3)SO_3^-Li^+$ are preferred.

In a case where the liquid composition contains a surfactant, the surfactant to be contained may be one type alone or two or more types in combination.

In a case where the non-aqueous electrolyte solution of the present invention contains a surfactant, the upper limit in the proportion of the mass of the surfactant to the total mass of the non-aqueous electrolyte solution is preferably 5 mass %, more preferably 3 mass %, further preferably 2 mass %. Further, the lower limit value is preferably 0.05 mass %.

The lower limit value of the conductivity at 25° C. of the non-aqueous electrolyte solution of the present invention is preferably 0.30 S/m. A secondary battery employing an electrolyte solution in which the conductivity at 25° C. of the non-aqueous electrolyte solution is less than 0.30 S/m, is poor in the power output properties and in the practical usefulness. When the conductivity at 25° C. of the non-aqueous electrolyte solution is at least 0.30 S/m, the secondary battery will be excellent in the power output properties.

Preferred Composition of Non-Aqueous Electrolyte Solution

As the non-aqueous electrolyte solution of the present invention, the following composition 1 is preferred, since it exhibits the desired effects of the present invention.
(Composition 1)

A non-aqueous electrolyte solution for a secondary battery comprising at least one lithium salt selected from the group consisting of $LiPF_6$, the compound (A), $FSO_2N(Li)SO_2F$, $CF_3SO_2N(Li)SO_2CF_3$, $CF_3CF_2SO_2N(Li)SO_2CF_2CF_3$, $LiClO_4$, the compound (B), the compound (C) and $LiBF_4$; at least one fluorinated solvent ($\alpha$) selected from the group consisting of compounds (1) to (4); and at least one cyclic carboxylic acid ester compound as the compound (5).

Further, composition 2 is more preferred.
(Composition 2)

A non-aqueous electrolyte solution for a secondary battery comprising at least one lithium salt selected from the group consisting of $LiPF_6$, $CF_3SO_2N(Li)SO_2CF_3$, $CF_3CF_2SO_2N(Li)SO_2CF_2CF_3$, $LiClO_4$ and $LiBF_4$; at least one fluorinated solvent ($\alpha$) selected from the group consisting of $CF_3CH_2OCF_2CHF_2$, $CF_3CH_2OCF_2CHFCF_3$, $CHF_2CF_2CH_2OCF_2CHF_2$, $CH_3CH_2CH_2OCHF_2$, $CH_3CH_2OCF_2CHF_2$, $CHF_2CF_2CH_2OCF_2CHFCF_3$, a compound represented by the above formula (2) wherein X is $CH_2CH_2$ and a compound represented by the above formula (2) wherein X is $CH(CH_3)CH_2$; and at least one cyclic carboxylic acid ester compound selected from the group consisting of γ-butyrolactone and γ-valerolactone.

Further, composition 3 is particularly preferred.
(Composition 3)

A non-aqueous electrolyte solution for a secondary battery comprising $LiPF_6$, $CHF_2CF_2CH_2OCF_2CFHCF_3$, and γ-butyrolactone and/or γ-valerolactone.

As the non-aqueous electrolyte solution containing a non-fluorinated unsaturated cyclic carbonate compound, the following composition 4 is preferred, since it exhibits the desired effects of the present invention.
(Composition 4)

A non-aqueous electrolyte solution for a secondary battery comprising at least one lithium salt selected from the group consisting of $LiPF_6$, the compound (A), $FSO_2N(Li)SO_2F$, $CF_3SO_2N(Li)SO_2CF_3$, $LiClO_4$, the compound (B), the compound (C) and $LiBF_4$; at least one fluorinated solvent ($\alpha$) selected from the group consisting of compounds (1) to (4); at least one cyclic carboxylic acid ester compound as the compound (5); and at least one non-fluorinated unsaturated cyclic carbonate compound selected from the group consisting of the compound (6) and the compound (7).

Further, composition 5 is more preferred.
(Composition 5)

A non-aqueous electrolyte solution for a secondary battery comprising at least one lithium salt selected from the group consisting of $LiPF_6$, $FSO_2N(Li)SO_2F$, $LiClO_4$ and $LiBF_4$; at least one fluorinated solvent ($\alpha$) selected from the group consisting of $CF_3CH_2OCF_2CHF_2$, $CF_3CH_2OCF_2CHFCF_3$, $CHF_2CF_2CH_2OCF_2CHF_2$, $CH_3CH_2CH_2OCHF_2$, $CH_3CH_2OCF_2CHF_2$, $CHF_2CF_2CH_2OCF_2CHFCF_3$, a compound represented by the above formula (2) wherein X is $CH_2CH_2$ and a compound represented by the above formula (2) wherein X is $CH(CH_3)CH_2$; at least one cyclic carboxylic acid ester compound selected from the group consisting of γ-butyrolactone and γ-valerolactone; and at least one non-fluorinated unsaturated cyclic carbonate compound selected from the group consisting of the compound (6) and the compound (7).

Further, composition 6 is particularly preferred.
(Composition 6)

A non-aqueous electrolyte solution for a secondary battery comprising $LiPF_6$, at least one member selected from the group consisting of $CF_3CH_2OCF_2CHF_2$ and $CHF_2CF_2CH_2OCF_2CHFCF_3$, γ-butyrolactone and/or γ-valerolactone, and vinylene carbonate.

As the non-aqueous electrolyte solution containing a fluorinated cyclic carbonate compound, the following composition 7 is preferred, since it exhibits the desired effects of the present invention.

(Composition 7)

A non-aqueous electrolyte solution for a secondary battery comprising at least one lithium salt selected from the group consisting of $LiPF_6$, the compound (A), $FSO_2N(Li)SO_2F$, $CF_3SO_2N(Li)SO_2CF_3$, $LiClO_4$, the compound (B), the compound (C) and $LiBF_4$; at least one fluorinated solvent ($\alpha$) selected from the group consisting of compounds (1) to (4); at least one cyclic carboxylic acid ester compound as the compound (5); and at least one fluorinated cyclic carbonate compound as the compound (8).

Further, composition 8 is more preferred.

(Composition 8)

A non-aqueous electrolyte solution for a secondary battery comprising at least one lithium salt selected from the group consisting of $LiPF_6$, $FSO_2N(Li)SO_2F$, $LiClO_4$ and $LiBF_4$; at least one fluorinated solvent ($\alpha$) selected from the group consisting of $CF_3CH_2OCF_2CHF_2$, $CF_3CH_2OCF_2CHFCF_3$, $CHF_2CF_2CH_2OCF_2CHF_2$, $CH_3CH_2CH_2OCHF_2$, $CH_3CH_2OCF_2CHF_2$, $CHF_2CF_2CH_2OCF_2CHFCF_3$, a compound represented by the above formula (2) wherein X is $CH_2CH_2$ and a compound represented by the above formula (2) wherein X is $CH(CH_3)CH_2$; at least one cyclic carboxylic acid ester compound selected from the group consisting of γ-butyrolactone and γ-valerolactone; and the compound (8-1).

Further, composition 9 is particularly preferred.

(Composition 9)

A non-aqueous electrolyte solution for a secondary battery comprising $LiPF_6$, at least one member selected from the group consisting of $CF_3CH_2OCF_2CHF_2$ and $CHF_2CF_2CH_2OCF_2CHFCF_3$, γ-butyrolactone and/or γ-valerolactone, and the compound (8-1).

<Lithium Ion Secondary Battery>

The lithium ion secondary battery of the present invention is a secondary battery comprising a positive electrode, a negative electrode and the non-aqueous electrolyte solution of the present invention.

Positive Electrode

The positive electrode may be an electrode wherein a positive electrode layer containing a positive electrode active material, a conductivity-imparting agent and a binder, is formed on a current collector.

The positive electrode active material may be any material so long as it is capable of absorbing and desorbing lithium ions, and a positive electrode active material for conventional lithium ion secondary batteries may be employed. For example, a lithium-containing transition metal oxide, a lithium-containing transition metal composite oxide using at least one transition metal, a transition metal oxide, a transition metal sulfide, a metal oxide or an olivine type metal lithium salt may, for example, be mentioned.

The lithium-containing transition metal oxide may, for example, be lithium cobalt oxide, lithium nickel oxide or lithium manganese oxide.

As a metal for the lithium-containing transition metal composite oxide, Al, V, Ti, Cr, Mn, Fe, Co, Li, Ni, Cu, Zn, Mg, Ga, Zr, Si or Yb is, for example, preferred. The lithium-containing transition metal composite oxide may, for example, be a lithium cobalt composite oxide such as $LiCoO_2$, a lithium nickel composite oxide such as $LiNiO_2$, a lithium manganese composite oxide such as $LiMnO_2$, $LiMn_2O_4$ or $Li_2MnO_3$, a lithium thernary composite oxide such as $Li(Ni_aCo_bMn_c)O_2$ (wherein a, b, c≥0, a+b+c=1) or one having a part of the transition metal atom which mainly constitutes such a lithium transition metal composite oxide substituted by another metal such as Al, Ti, V, Cr, Mn, Fe, Co, Li, Ni, Cu, Zn, Mg, Ga, Zr, Si or Yb. One having substituted by another metal may specifically be, for example, $LiMn_{0.5}Ni_{0.5}O_2$, $LiMn_{1.8}Al_{0.2}O_4$, $LiNi_{0.85}Co_{0.10}Al_{0.05}O_2$, $LiMn_{1.5}Ni_{0.5}O_4$, $LiNi_{1/3}Co_{1/3}Mn_{1/3}O_2$ or $LiMn_{1.8}Al_{0.2}O_4$.

The transition metal oxide may, for example, be $TiO_2$, $MnO_2$, $MoO_3$, $V_2O_5$ or $V_6O_{13}$. The transition metal sulfide may, for example, be $TiS_2$, $FeS$ or $MoS_2$. The metal oxide may, for example, be $SnO_2$ or $SiO_2$.

The olivine type metal lithium salt is a substance represented by the formula $Li_LX_xY_yO_zF_g$ (wherein X is Fe(II), Co(II), Mn(II), Ni(II), V(II) or Cu(II), Y is P or Si, and L, x, y, z and g are, respectively, 0≤L≤3, 1≤x≤2, 1≤y≤3, 4≤z≤12 and 0≤g≤1) or a composite thereof. For example, $LiFePO_4$, $Li_3Fe_2(PO_4)_3$, $LiFeP_2O_7$, $LiMnPO_4$, $LiNiPO_4$, $LiCoPO_4$, $Li_2FePO_4F$, $Li_2MnPO_4F$, $Li_2NiPO_4F$, $Li_2CoPO_4F$, $Li_2FeSiO_4$, $Li_2MnSiO_4$, $Li_2NiSiO_4$ or $Li_2CoSiO_4$ may be mentioned.

These positive electrode active materials may be used alone or in combination as a mixture of two or more of them.

Further, such a positive electrode active material having on its surface an attached substance having a composition different from the substance constituting the positive electrode active material as the main component may also be used. The surface-attached substance may, for example, be an oxide such as aluminum oxide, silicon oxide, titanium oxide, zirconium oxide, magnesium oxide, calcium oxide, boron oxide, antimony oxide or bismuth oxide; a sulfate such as lithium sulfate, sodium sulfate, potassium sulfate, magnesium sulfate, calcium sulfate or aluminum sulfate; or a carbonate such as lithium carbonate, calcium carbonate or magnesium carbonate.

With regard to the amount of the surface-attached substance, the lower limit of the mass to the positive electrode active material is preferably 0.1 mass ppm, more preferably 1 mass ppm, further preferably 10 mass ppm. The upper limit is preferably 20 mass %, more preferably 10 mass %, further preferably 5 mass %. By the surface-attached substance, it is possible to suppress an oxidation reaction of the non-aqueous electrolyte solution at the surface of the positive electrode active material and thereby to improve the battery life.

The positive electrode active material is preferably a lithium-containing composite oxide having an $\alpha$-$NaCrO_2$ structure as matrix, such as $LiCoO_2$, $LiNiO_2$ or $LiMnO_2$, or a lithium-containing composite oxide having a spinel structure as matrix, such as $LiMn_2O_4$, since its discharge voltage is high and its electrochemical stability is high.

The conductivity-imparting agent may, for example, be a metal material such as Al or a powder of a conductive oxide, in addition to a carbon material.

The binder may, for example, be a resin binder such as polyvinylidene fluoride, or a rubber binder such as hydrocarbon rubber or fluorinated rubber.

The current collector may be a thin metal film composed mainly of e.g. Al.

Negative Electrode

The negative electrode may be an electrode wherein a negative electrode layer containing a negative electrode active material, a conductivity-imparting agent and a binder, is formed on a current collector.

The negative electrode active material may be at least one member selected from the group consisting of lithium metal, a lithium alloy and a carbon material capable of absorbing and desorbing lithium ions.

The carbon material may, for example, be graphite, coke or hard carbon.

The lithium alloy may, for example, be a Li—Al alloy, a Li—Pb alloy or a Li—Sn alloy.

As the binder and conductivity-imparting agent for the negative electrode, ones equal to those for the positive electrode may be used.

Further, in a case where the negative electrode active material can maintain the shape by itself (e.g. a thin lithium metal film), the negative electrode may be formed solely of the negative electrode active material.

Between the positive electrode and the negative electrode, a separator is usually interposed in order to prevent short circuiting. Such a separator may, for example, be a porous film. In such a case, the non-aqueous electrolyte solution is used as impregnated to the porous film. Further, such a porous film having the non-aqueous electrolyte solution impregnated and gelated, may be used as a gel electrolyte.

As the porous film, one which is stable against the non-aqueous electrolyte solution and is excellent in the liquid-maintaining property, may be used. Preferred is a porous sheet or a non-woven fabric made of a fluororesin such as polyvinylidene fluoride, polytetrafluoroethylene or a copolymer of ethylene and tetrafluoroethylene, a polyimide, or a polyolefin such as polyethylene or polypropylene. The material for the porous film is more preferably a polyolefin such as polyethylene or polypropylene.

The material for a battery exterior package to be used for the lithium ion secondary battery of the present invention may, for example, be nickel-plated iron, stainless steel, aluminum or its alloy, nickel, titanium, a resin material, or a film material.

The shape of the secondary battery may be selected depending upon the particular application, and it may be a coin-form, a cylindrical form, a square form or a laminate form. Further, the shapes of the positive electrode and the negative electrode may also be suitably selected to meet with the shape of the secondary battery.

The charging voltage of the secondary battery of the present invention is preferably at least 3.4 V, more preferably at least 4.0 V, further preferably at least 4.2 V. In a case where the positive electrode active material of the secondary battery is a lithium-containing transition metal oxide, a lithium-containing transition metal composite oxide, a transition metal oxide, a transition metal sulfide or a metal oxide, the charging voltage is preferably at least 4.0 V, more preferably at least 4.2 V. Further, in a case where the positive electrode active material is an olivine type metal lithium salt, the charging voltage is preferably at least 3.2 V, more preferably at least 3.4 V.

The secondary battery of the present invention as described above, employs the non-aqueous electrolyte solution of the present invention, whereby it is excellent in the cycle properties, has a low reactivity of the non-aqueous electrolyte solution with the positive electrode and the negative electrode, is less susceptible to thermal runaway and has a practically sufficient conductivity. Thus, the secondary battery of the present invention may be used in various applications to e.g. mobile phones, portable game devices, digital cameras, digital video cameras, electric tools, notebook computers, portable information terminals, portable music players, electric vehicles, hybrid cars, electric trains, aircrafts, satellites, submarines, ships, uninterruptible power supply systems, robots and electric power storage systems. Further, the secondary battery of the present invention is particularly effective as a large size secondary battery for e.g. electric vehicles, hybrid cars, electric trains, aircrafts, satellites, submarines, ships, uninterruptible power supply systems, robots and electric power storage systems.

EXAMPLES

Now, the present invention will be described in detail with reference to Examples. However, it should be understood that the present invention is by no means restricted by the following description.

Example I

Solubility

The solubility was evaluated by observing the state of dissolution of the non-aqueous electrolyte solution after expiration of one hour from the preparation of the non-aqueous electrolyte solution. In the evaluation, one uniformly dissolved was identified by "○ (good)", and one separated into two phases was identified by "x (no good)".

Conductivity

The measurement of the conductivity (unit: S/m) was carried out with respect to the obtained non-aqueous electrolyte solution at 25° C. by a known method disclosed in "Molten Salts and High Temperature Chemistry, 2002, 45, 43". That is, at both ends of a T-type electrochemical cell having a bottom length of 5 cm and an inner diameter of 4.8 mm, metal lithium-bonded electrodes were set. Thereafter, the prepared electrolyte solution was sufficiently injected, and the cell was sealed. The solution resistance in the obtained electrochemical cell was measured by a complex impedance method by using Potentiostat/Galvanostat (trade name: "VMP3", manufactured by BioLogic) in a constant temperature bath after being left to stand still for one hour in the constant temperature bath at 25° C. From the obtained solution resistance value, the conductivity of each electrolyte solution was calculated.

Method for Evaluation of Negative Electrode Reactivity

1. Preparation of Electrode (Negative Electrode) for Evaluation

An operation of mixing artificial graphite (4.25 g) and acetylene black (0.15 g) as a conductivity-imparting agent and stirring the mixture at a rotational speed of 2,000 rpm for one minute by means of a planetary centrifugal mixer (Awatori Rentaro AR-E310, manufactured by Kabushiki Kaisha Thinky), was carried out three times. Then, an operation of adding a 1 mass % carboxymethyl cellulose aqueous solution (4.25 g) and further, stirring the mixture at a rotational speed of 2,000 rpm for 5 minutes by means of the above mixer, was carried out twice. Further, a 1 mass % carboxymethyl cellulose aqueous solution (4.25 g) was added, and by means of the above mixer, stirring was carried out at a rotational speed of 2,000 rpm for 10 minutes. Then, a styrene-butadiene rubber latex (0.13 g) having the solid content concentration adjusted to 40 mass %, was added as a binder, and by means of the above mixer, stirring was carried out at a rotational speed of 2,000 rpm for 5 minutes to obtain a slurry for coating an electrode.

On a copper foil having a thickness of 20 µm, the above slurry was applied in a thickness of 150 µm and dried, followed by punching out in a circle having a diameter of 19 mm to obtain an electrode (negative electrode) for evaluation.

2. Test for Evaluation of Negative Electrode Reactivity

The negative electrode prepared by the above method was used as an electrode for evaluation, and one having a lithium metal foil punched out in a circle having a diameter of 19 mm, was used as a counter electrode. Between these electrodes, a polyolefin type finely porous film was interposed. Further, a non-aqueous electrolyte solution having 2 mass % of vinylene carbonate added to 0.5 mL of a carbonate type non-aqueous electrolyte solution (a non-aqueous electrolyte solution having ethylene carbonate and ethylmethyl carbonate mixed in a mass ratio of 3:7 and having $LiPF_6$ dissolved to be 1.0 M, manufactured by Kishida Chemical Co., Ltd.), was added to prepare a single pole cell made of graphite-lithium metal foil.

With respect to the obtained single pole cell, the following charging/discharging cycles were carried out. In cycle 1, constant current charging to 0.2 V (negative electrode) was carried out at 25° C. at a current corresponding to 0.04 C, further constant current charging to 0.05 V was carried out at a current corresponding to 0.2 C and further, constant voltage charging was carried out at the charging upper limit voltage until the current value became a current corresponding to 0.02 C. Then, constant current discharging to 1.0 V was carried out at a current corresponding to 0.2 C. In cycles 2 to 4, constant current charging to 0.05 V was carried out at a current corresponding to 0.2 C, and further, constant voltage charging was carried out at the charging lower limit voltage until the current value became a current corresponding to 0.02 C. Then, constant current discharging to 1.0 V was carried out at a current corresponding to 0.2 C. In cycle 5, constant current charging to 0.05 V was carried out at a current corresponding to 0.2 C. Then, the obtained single pole cell in the charged state was decomposed in an argon atmosphere to obtain the negative electrode in a charged state. The obtained negative electrode was washed three times with dimethyl carbonate (2 mL) and vacuum-dried, followed by punching out in a circle having a diameter of 5 mm. The punched out electrode was put in a sealing container made of stainless steel (SUS), and further, 2 µL of the non-aqueous electrolyte solution obtained in each Example was put, whereupon the container was sealed, to obtain a sample for evaluation. With respect to each sample for evaluation, measurement was carried out by means of a differential scanning calorimeter (DSC-6000, manufactured by SII Nanotechnology) within a temperature range of from 50 to 350° C. at a temperature raising rate of 5° C./min.

3. Evaluation of Negative Electrode Reactivity

For evaluation of the negative electrode reactivity, the "heat generation peak temperature" and the "heat value at 200° C." were used.

The "heat generation peak temperature" is the peak top temperature of a heat generation peak appearing at the lowest temperature side among heat generation peaks, of which heat values exceed 2,000 µW, at the time when the heat value at 60° C. in the above measurement is corrected to be 0. In the evaluation of the heat generation peak temperature, at least 200° C. was evaluated to be "⊚ (excellent)", at least 180° C. and less than 200° C. was evaluated to be "○ (good)", at least 150° C. and less than 180° C. was evaluated to be "Δ (no good)", and less than 150° C. was evaluated to be "x (very bad)".

The "heat value at 200° C." is the heat value (µW) at 200° C. at the time when the heat value at 60° C. in the above measurement is corrected to be 0.

Method for Evaluation of Positive Electrode Reactivity

1. Preparation of Electrode (Positive Electrode) for Evaluation

An operation of mixing $LiCoO_2$ (trade name: "Selion C", manufactured by AGC Seimi Chemical Co., Ltd., 32.0 g) and carbon black (trade name: "DENKABLACK, manufactured by Denki Kagaku Kogyo Kabushiki Kaisha, 0.80 g) and stirring the mixture at a rotational speed of 2,000 rpm for one minute by means of the above mixer, was carried out three times. Then, an operation of adding N-methyl-2-pyrrolidone (7.50 g) and stirring the mixture at a rotational speed of 2,000 rpm for 3 minutes by means of the above mixer, was carried out three times. Then, an operation of adding N-methyl-2-pyrrolidone (1.0 g) and stirring the mixture at a rotational speed of 2,000 rpm for 3 minutes by means of the above mixer, was carried out three times. Further, an N-methyl-2-pyrrolidone solution of polyvinylidene fluoride (11 mass %, 7.45 g) was added and by means of the above mixer, stirring was carried out at a rotational speed of 2,000 rpm for 1 minute to obtain a slurry. The above slurry was applied to an aluminum foil having a thickness of 20 µm, in a thickness of 150 µm and dried, followed by punching out in a circle having a diameter of 18 mm to obtain an electrode (positive electrode) for evaluation.

2. Test for Evaluation of Positive Electrode Reactivity

The positive electrode prepared by the above method was used as an electrode for evaluation, and one having a lithium metal foil punched out in a circle having a diameter of 19 mm, was used as a counter electrode. Between these electrodes, a polyolefin type finely porous film was interposed. Further, 0.5 mL of a carbonate type non-aqueous electrolyte solution (a non-aqueous electrolyte solution having ethylene carbonate and ethylmethyl carbonate mixed in a mass ratio of 3:7 and having $LiPF_6$ dissolved to be 1.0 M, manufactured by Kishida Chemical Co., Ltd.), was added to prepare a single pole cell made of $LiCoO_2$ electrode-lithium metal foil.

With respect to the obtained single pole cell, the following charging/discharging cycles were carried out. In cycles 1 to 4, constant current charging to 4.5 V was carried out at a current corresponding to 0.5 C, and further constant voltage charging was carried out at the charging lower limit voltage until the current value became a current corresponding to 0.02 C. Then, constant current discharging to 3.0 V was carried out at a current corresponding to 0.2 C. In cycle 5, constant current charging to 4.5 V was carried out at a current corresponding to 0.5 C, and further constant voltage charging was carried out at the charging lower limit voltage until the current value became a current corresponding to 0.02 C. Then, the obtained single pole cell in the charged state was decomposed in an argon atmosphere to obtain the positive electrode in a charged state. The obtained positive electrode was washed three times with dimethyl carbonate (2 mL) and vacuum-dried, followed by punching out in a circle having a diameter of 5 mm. The punched out electrode was put in a sealing container made of stainless steel (SUS), and further, 2 µL of the non-aqueous electrolyte solution obtained in each Example was put, whereupon the container was sealed, to obtain a sample for evaluation. With respect to each sample for evaluation, measurement was carried out by means of a differential scanning calorimeter (DSC-6000, manufactured by SII Nanotechnology) within a temperature range of from 50 to 350° C. at a temperature raising rate of 5° C./min.

Like in the evaluation of the negative electrode reactivity, the evaluation of the positive electrode was made by the "heat generation peak temperature" and the "heat value at 200° C.".

Ex. 1 to 24, 30 to 33 and 39 are Examples of the present invention, and Ex. 25 to 29 and 34 to 38 are Comparative Examples.

Ex. 1

$LiPF_6$ (0.11 g) as a lithium salt was dispersed in $CHF_2CF_2CH_2OCF_2CHFCF_3$ (1.23 g) as a fluorinated ether compound, and then, γ-butyrolactone (0.24 g) as the compound (5) was mixed to obtain a non-aqueous electrolyte solution 1A.

Ex. 2 to 38

Non-aqueous electrolyte solutions 2 to 38 were obtained in the same manner as in Ex. 1 except that the composition of the lithium salt and various compounds was changed as shown in Tables 1 to 5.

Here, mass % in Tables 1 to 5 is a proportion based on the entire non-aqueous electrolyte solution being 100 mass %.

Evaluation results in each Ex. are shown in Tables 1 to 5. Here, abbreviations in Tables 1 to 5 have the following meanings.

AE3000: $CF_3CH_2OCF_2CHF_2$ (trade name: AE-3000, manufactured by Asahi Glass Company Limited)
HFE458: $CF_2HCF_2CH_2OCF_2CF_2H$
HFE449: $CF_3CH_2OCF_2CFHCF_3$
HFE5510: $CHF_2CF_2CH_2OCF_2CHFCF_3$
MFA: methyl difluoroacetate
ETFA: ethyl trifluoroacetate
TFEOc: bis(2,2,2-trifluoroethyl) carbonate
GBL: γ-butyrolactone
GVL: γ-valerolactone
EC: ethylene carbonate
PC: propylene carbonate
EMC: ethylmethyl carbonate
DMC: dimethyl carbonate
DEC: diethyl carbonate
TMP: trimethyl phosphoric acid
SL: sulfolane
SX-1: compound represented by the following formula

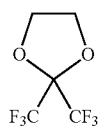

TABLE 1

| | | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Type of non-aqueous electrolyte solution | | | | 1 | 2 | 3 | 4 | 5 | 6 | 7 | 8 |
| Lithium salt | $LiPF_6$ | | g | 0.11 | 0.15 | 0.18 | 0.23 | 0.15 | 0.15 | 0.15 | 0.15 |
| | | | mmol | 0.7 | 1.0 | 1.2 | 1.5 | 1.0 | 1.0 | 1.0 | 1.0 |
| | | | mass % | 7.3 | 9.6 | 11.5 | 14.3 | 9.9 | 10.3 | 10.0 | 11.1 |
| Fluorinated solvent (α) | Compound (1) | AE3000 | g | 1.08 | — | — | — | — | — | — | — |
| | | | mass % | 73.6 | — | — | — | — | — | — | — |
| | | HFE458 | g | — | — | — | — | — | — | — | — |
| | | | mass % | — | — | — | — | — | — | — | — |
| | | HFE449 | g | — | — | — | — | — | — | — | — |
| | | | mass % | — | — | — | — | — | — | — | — |
| | | HFE5510 | g | — | 1.08 | 0.99 | 0.84 | 0.87 | 0.54 | 0.76 | — |
| | | | mass % | — | 68.6 | 62.4 | 53.1 | 56.4 | 36.8 | 50.0 | — |
| | | SX-1 | g | — | — | — | — | — | — | — | — |
| | | | mass % | — | — | — | — | — | — | — | — |
| | Compound (3) | MFA | g | — | — | — | — | 0.17 | 0.44 | 0.26 | 0.87 |
| | | | mass % | — | — | — | — | 11.3 | 29.6 | 17.3 | 63.7 |
| | | ETFA | g | — | — | — | — | — | — | — | — |
| | | | mass % | — | — | — | — | — | — | — | — |
| | Compound (4) | TFEOc | g | — | — | — | — | — | — | — | — |
| | | | mass % | — | — | — | — | — | — | — | — |
| Compound (5) | | GBL | g | 0.24 | 0.34 | 0.41 | 0.52 | 0.34 | 0.34 | 0.34 | 0.34 |
| | | | mmol | 2.8 | 4.0 | 4.8 | 6.0 | 4.0 | 4.0 | 4.0 | 4.0 |
| | | | mass % | 16.0 | 21.8 | 26.1 | 32.5 | 22.4 | 23.3 | 22.7 | 25.2 |
| $N_B/N_{Li}$ ratio | | | | 4.0 | 4.0 | 4.0 | 4.0 | 4.0 | 4.0 | 4.0 | 4.0 |
| $(N_A + N_B)/N_{Li}$ ratio | | | | 4.0 | 4.0 | 4.0 | 4.0 | 4.0 | 4.0 | 4.0 | 4.0 |
| Solubility | | | | ○ | ○ | ○ | ○ | ○ | ○ | ○ | ○ |
| Conductivity | | | S/m | 0.45 | 0.30 | 0.35 | 0.38 | 0.49 | 0.59 | 0.83 | 1.58 |
| Negative electrode reactivity | Heat generation peak temperature | | | ◎ | ◎ | ◎ | ◎ | ◎ | ◎ | ◎ | ◎ |
| | Heat value at 200° C. [μW] | | | 1030 | 1030 | 1020 | 1000 | 1400 | 1340 | 1350 | 1470 |
| Positive electrode reactivity | Heat generation peak temperature | | | ◎ | ◎ | ◎ | ◎ | ◎ | ◎ | ◎ | ◎ |
| | Heat value at 200° C. [μW] | | | 510 | 510 | 830 | 910 | 930 | 820 | 1160 | 690 |

TABLE 2

| | | | | Ex. 9 | Ex. 10 | Ex. 11 | Ex. 12 | Ex. 13 | Ex. 14 | Ex. 15 |
|---|---|---|---|---|---|---|---|---|---|---|
| Type of non-aqueous electrolyte solution | | | | 9 | 10 | 11 | 12 | 13 | 14 | 15 |
| Lithium salt | $LiPF_6$ | | g | 0.15 | 0.15 | 0.15 | 0.15 | 0.15 | 0.15 | 0.15 |
| | | | mmol | 1.0 | 1.0 | 1.0 | 1.0 | 1.0 | 1.0 | 1.0 |
| | | | mass % | 9.9 | 9.6 | 9.7 | 10.0 | 9.8 | 9.8 | 9.7 |

TABLE 2-continued

|  |  |  |  | Ex. 9 | Ex. 10 | Ex. 11 | Ex. 12 | Ex. 13 | Ex. 14 | Ex. 15 |
|---|---|---|---|---|---|---|---|---|---|---|
| Fluorinated solvent (α) | Compound (1) | AE3000 | g | — | — | 0.20 | 1.02 | — | — | — |
|  |  |  | mass % | — | — | 13.0 | 67.3 | — | — | — |
|  |  | HFE458 | g | — | — | — | — | 1.06 | — | — |
|  |  |  | mass % | — | — | — | — | 68.1 | — | — |
|  |  | HFE449 | g | — | — | — | — | — | 1.06 | — |
|  |  |  | mass % | — | — | — | — | — | 68.1 | — |
|  |  | HFE5510 | g | 0.87 | 0.87 | 0.87 | — | — | — | 0.81 |
|  |  |  | mass % | 56.7 | 55.1 | 55.3 | — | — | — | 51.8 |
|  |  | SX-1 | g | — | — | — | — | — | — | 0.26 |
|  |  |  | mass % | — | — | — | — | — | — | 16.6 |
|  | Compound (3) | MFA | g | — | — | — | — | — | — | — |
|  |  |  | mass % | — | — | — | — | — | — | — |
|  |  | ETFA | g | 0.5 | — | — | — | — | — | — |
|  |  |  | mass % | 10.8 | — | — | — | — | — | — |
|  | Compound (4) | TFEOc | g | — | 0.21 | — | — | — | — | — |
|  |  |  | mass % | — | 13.9 | — | — | — | — | — |
| Compound (5) |  | GBL | g | 0.34 | 0.34 | 0.34 | 0.34 | 0.34 | 0.34 | 0.34 |
|  |  |  | mmol | 4.0 | 4.0 | 4.0 | 4.0 | 4.0 | 4.0 | 4.0 |
|  |  |  | mass % | 22.5 | 21.9 | 22.0 | 22.7 | 22.1 | 22.1 | 21.9 |
|  |  | $N_B/N_{Li}$ ratio |  | 4.0 | 4.0 | 4.0 | 4.0 | 4.0 | 4.0 | 4.0 |
|  |  | $(N_A + N_B)/N_{Li}$ ratio |  | 4.0 | 4.0 | 4.0 | 4.0 | 4.0 | 4.0 | 4.0 |
|  |  | Solubility |  | ◯ | ◯ | ◯ | ◯ | ◯ | ◯ | ◯ |
|  |  | Conductivity | S/m | 0.33 | 0.35 | 0.35 | 0.64 | 0.56 | 0.53 | 0.32 |
| Negative electrode reactivity |  | Heat generation peak temperature |  | ◎ | ◎ | ◎ | ◎ | ◎ | ◎ | ◎ |
|  |  | Heat value at 200° C. [μW] |  | 800 | 1500 | 1360 | 1470 | 860 | 700 | 570 |
| Positive electrode reactivity |  | Heat generation peak temperature |  | ◎ | ◎ | ◎ | ◎ | ◎ | ◎ | ◎ |
|  |  | Heat value at 200° C. [μW] |  | 1170 | 680 | 550 | 590 | 340 | 1050 | 300 |

TABLE 3

|  |  |  |  | Ex. 16 | Ex. 17 | Ex. 18 | Ex. 19 | Ex. 20 | Ex. 21 | Ex. 22 |
|---|---|---|---|---|---|---|---|---|---|---|
| Type of non-aqueous electrolyte solution |  |  |  | 16 | 17 | 18 | 19 | 20 | 21 | 22 |
| Lithium salt |  | LiPF$_6$ | g | 0.15 | 0.15 | 0.15 | 0.15 | 0.15 | 0.15 | 0.15 |
|  |  |  | mmol | 1.0 | 1.0 | 1.0 | 1.0 | 1.0 | 1.0 | 1.0 |
|  |  |  | mass % | 10.4 | 9.6 | 9.5 | 9.6 | 9.8 | 9.9 | 10.1 |
| Fluorinated solvent (α) | Compound (1) | AE3000 | g | 0.91 | — | — | — | — | 0.20 | 0.20 |
|  |  |  | mass % | 62.3 | — | — | — | — | 13.3 | 13.6 |
|  |  | HFE458 | g | — | — | — | — | — | — | — |
|  |  |  | mass % | — | — | — | — | — | — | — |
|  |  | HFE5510 | g | — | 1.06 | 1.02 | 1.07 | 0.98 | 0.76 | 0.65 |
|  |  |  | mass % | — | 66.6 | 69.9 | 67.6 | 63.3 | 49.5 | 43.4 |
| Compound (5) |  | GBL | g | — | 0.26 | 0.26 | 0.26 | 0.34 | 0.34 | 0.34 |
|  |  |  | mmol | — | 3.0 | 3.0 | 3.0 | 4.0 | 4.0 | 4.0 |
|  |  |  | mass % | — | 16.3 | 16.2 | 16.3 | 22.3 | 22.5 | 23.0 |
|  |  | GVL | g | 0.40 | — | — | — | — | — | — |
|  |  |  | mmol | 4.0 | — | — | — | — | — | — |
|  |  |  | mass % | 27.4 | — | — | — | — | — | — |
| Other solvent | Non-fluorinated saturated cyclic carbonate compound | EC | g | — | — | — | — | — | — | — |
|  |  |  | mmol | — | — | — | — | — | — | — |
|  |  |  | mass % | — | — | — | — | — | — | — |
|  |  | PC | g | — | — | — | 0.10 | — | — | — |
|  |  |  | mmol | — | — | — | 1.0 | — | — | — |
|  |  |  | mass % | — | — | — | 6.5 | — | — | — |
|  | Non-fluorinated chain carbonate compound | DMC | g | — | — | — | — | — | 0.07 | 0.15 |
|  |  |  | mmol | — | — | — | — | — | 0.82 | 1.65 |
|  |  |  | mass % | — | — | — | — | — | 4.8 | 9.9 |
|  |  | EMC | g | — | — | — | — | 0.07 | — | — |
|  |  |  | mmol | — | — | — | — | 0.70 | — | — |
|  |  |  | mass % | — | — | — | — | 4.5 | — | — |
|  | Phosphoric acid ester compound | TMP | g | — | — | 0.07 | — | — | — | — |
|  |  |  | mmol | — | — | 0.5 | — | — | — | — |
|  |  |  | mass % | — | — | 4.4 | — | — | — | — |
|  | Saturated cyclic sulfone compound | SL | g | — | 0.12 | — | — | — | — | — |
|  |  |  | mmol | — | 1.0 | — | — | — | — | — |
|  |  |  | mass % | — | 7.6 | — | — | — | — | — |
|  |  | $N_A/N_{Li}$ ratio |  | 4.0 | 3.0 | 3.0 | 3.0 | 4.0 | 4.0 | 4.0 |
|  |  | $(N_A + N_B)/N_{Li}$ ratio |  | 4.0 | 4.0 | 3.5 | 4.0 | 4.7 | 4.8 | 5.7 |
|  |  | Solubility |  | ◯ | ◯ | ◯ | ◯ | ◯ | ◯ | ◯ |
|  |  | Conductivity | S/m | 0.55 | 0.30 | 0.35 | 0.33 | 0.41 | 0.44 | 0.50 |

TABLE 3-continued

|  |  | Ex. 16 | Ex. 17 | Ex. 18 | Ex. 19 | Ex. 20 | Ex. 21 | Ex. 22 |
| --- | --- | --- | --- | --- | --- | --- | --- | --- |
| Negative electrode reactivity | Heat generation peak temperature | ◎ | ◎ | ◎ | ◎ | ◎ | ◎ | ◎ |
|  | Heat value at 200° C. [μW] | 1900 | 1080 | 920 | 780 | 830 | 800 | 580 |
| Positive electrode reactivity | Heat generation peak temperature | ◎ | ◎ | ◎ | ◎ | ○ | ◎ | ◎ |
|  | Heat value at 200° C. [μW] | 1850 | 730 | 600 | 480 | 1000 | 230 | 500 |

TABLE 4

|  |  |  |  | Ex. 23 | Ex. 24 | Ex. 25 | Ex. 26 | Ex. 27 | Ex. 28 | Ex. 29 |
| --- | --- | --- | --- | --- | --- | --- | --- | --- | --- | --- |
| Type of non-aqueous electrolyte solution |  |  |  | 23 | 24 | 25 | 26 | 27 | 28 | 29 |
| Lithium salt | LiPF$_6$ |  | g | 0.15 | 0.15 | 0.18 | 0.15 | 0.15 | 0.15 | 0.15 |
|  |  |  | mmol | 1.0 | 1.0 | 1.2 | 1.0 | 1.0 | 1.0 | 1.0 |
|  |  |  | mass % | 9.8 | 10.0 | 14.0 | 9.6 | 12.1 | 10.9 | 9.4 |
| Fluorinated solvent (α) | Compound (1) | AE3000 | g | — | — | — | — | — | — | — |
|  |  |  | mass % | — | — | — | — | — | — | — |
|  |  | HFE458 | g | — | — | — | — | — | — | 1.22 |
|  |  |  | mass % | — | — | — | — | — | — | 75.6 |
|  |  | HFE5510 | g | 0.96 | 0.84 | — | 1.03 | — | 0.54 | — |
|  |  |  | mass % | 62.3 | 55.8 | — | 64.7 | — | 39.1 | — |
| Compound (5) |  | GBL | g | 0.43 | 0.52 | 1.12 | — | — | 0.34 | 0.12 |
|  |  |  | mmol | 5.0 | 6.0 | 13.2 | — | — | 4.0 | 1.3 |
|  |  |  | mass % | 27.8 | 34.2 | 86.0 | — | — | 24.8 | 6.9 |
|  |  | GVL | g | — | — | — | — | — | — | — |
|  |  |  | mmol | — | — | — | — | — | — | — |
|  |  |  | mass % | — | — | — | — | — | — | — |
| Other solvent | Non-fluorinated saturated cyclic carbonate compound | EC | g | — | — | — | — | 0.40 | — | 0.13 |
|  |  |  | mmol | — | — | — | — | 4.5 | — | 1.5 |
|  |  |  | mass % | — | — | — | — | 31.6 | — | 8.2 |
|  |  | PC | g | — | — | — | 0.41 | — | — | — |
|  |  |  | mmol | — | — | — | 4.0 | — | — | — |
|  |  |  | mass % | — | — | — | 25.7 | — | — | — |
|  | Non-fluorinated chain carbonate compound | DMC | g | — | — | — | — | — | — | — |
|  |  |  | mmol | — | — | — | — | — | — | — |
|  |  |  | mass % | — | — | — | — | — | — | — |
|  |  | EMC | g | — | — | — | — | 0.71 | 0.35 | — |
|  |  |  | mmol | — | — | — | — | 6.80 | 3.40 | — |
|  |  |  | mass % | — | — | — | — | 56.3 | 25.2 | — |
|  | Phosphoric acid ester compound | TMP | g | — | — | — | — | — | — | — |
|  |  |  | mmol | — | — | — | — | — | — | — |
|  |  |  | mass % | — | — | — | — | — | — | — |
|  | Saturated cyclic sulfone compound | SL | g | — | — | — | — | — | — | — |
|  |  |  | mmol | — | — | — | — | — | — | — |
|  |  |  | mass % | — | — | — | — | — | — | — |
|  | $N_A/N_{Li}$ ratio |  |  | 5.0 | 6.0 | 11.0 | — | — | 4.0 | 1.3 |
|  | $(N_A + N_B)/N_{Li}$ ratio |  |  | 5.0 | 6.0 | 11.0 | 4.0 | 11.3 | 7.4 | 2.8 |
|  | Solubility |  |  | ○ | ○ | ○ | ○ | ○ | ○ | X |
|  | Conductivity |  | S/m | 0.42 | 0.48 | — | — | — | — | — |
| Negative electrode reactivity | Heat generation peak temperature |  |  | ◎ | ◎ | Δ | ○ | ◎ | ◎ | — |
|  | Heat value at 200° C. [μW] |  |  | 960 | 1070 | 1430 | 2250 | 820 | 870 | — |
| Positive electrode reactivity | Heat generation peak temperature |  |  | ◎ | ○ | ○ | Δ | Δ | Δ | — |
|  | Heat value at 200° C. [μW] |  |  | 1890 | 2050 | 2080 | 2520 | 2200 | 1700 | — |

TABLE 5

|  |  |  | Ex. 30 | Ex. 31 | Ex. 32 | Ex. 33 | Ex. 34 | Ex. 35 | Ex. 36 | Ex. 37 | Ex. 38 |
|---|---|---|---|---|---|---|---|---|---|---|---|
| Type of non-aqueous electrolyte solution |  |  | 30 | 31 | 32 | 33 | 34 | 35 | 36 | 37 | 38 |
| Lithium salt | LiPF$_6$ | g | 0.15 | 0.15 | 0.08 | — | — | — | 0.15 | — | 0.15 |
|  |  | mmol | 1.0 | 1.0 | 0.5 | — | — | — | 1.0 | — | 1.0 |
|  |  | mass % | 10.2 | 10.4 | 5.2 | — | — | — | 10.3 | — | 10.5 |
|  | LiBF$_4$ | g | — | — | 0.05 | 0.09 | — | — | — | — | — |
|  |  | mmol | — | — | 0.5 | 0.1 | — | — | — | — | — |
|  |  | mass % | — | — | 3.2 | 6.5 | — | — | — | — | — |
|  | LiN(SO$_2$CF$_2$CF$_3$)$_2$ | g | — | — | — | — | 0.39 | 0.39 | — | 0.39 | — |
|  |  | mmol | — | — | — | — | 1.0 | 1.0 | — | 1.0 | — |
|  |  | mass % | — | — | — | — | 22.7 | 24.2 | — | 21.2 | — |
| Fluorinated solvent (α) | Compound (1) AE3000 | g | 0.31 | 0.31 | 0.20 | 0.20 | — | — | — | — | — |
|  |  | mass % | 20.5 | 21.0 | 13.9 | 14.2 | — | — | — | — | — |
|  | HFE5510 | g | 0.65 | 0.43 | 0.65 | 0.65 | 0.63 | 0.31 | 0.63 | 0.78 | 0.60 |
|  |  | mass % | 36.3 | 29.7 | 44.3 | 45.2 | 36.7 | 19.5 | 42.4 | 42.9 | 41.8 |
| Compound (5) | GBL | g | 0.34 | 0.34 | 0.34 | 0.34 | 0.56 | 0.86 | 0.45 | 0.11 | 0.69 |
|  |  | mmol | 4.0 | 4.0 | 4.0 | 4.0 | 6.5 | 10.0 | 5.2 | 1.3 | 8.0 |
|  |  | mass % | 23.1 | 23.6 | 23.4 | 23.9 | 32.8 | 53.8 | 30.3 | 6.1 | 47.7 |
| Other solvent | Non-fluorinated saturated cyclic carbonate compound | EC g | — | — | — | — | 0.13 | 0.04 | 0.13 | 0.13 | — |
|  |  | mmol | — | — | — | — | 1.5 | 0.5 | 1.5 | 1.5 | — |
|  |  | mass % | — | — | — | — | 7.7 | 2.5 | 8.9 | 7.2 | — |
|  | PC | g | — | — | — | — | — | — | 0.12 | — | — |
|  |  | mmol | — | — | — | — | — | — | 1.2 | — | — |
|  |  | mass % | — | — | — | — | — | — | 8.0 | — | — |
|  | Non-fluorinated chain carbonate compound | DMC g | 0.15 | 0.22 | 0.15 | 0.15 | — | — | — | — | — |
|  |  | mmol | 1.6 | 2.5 | 1.6 | 1.6 | — | — | — | — | — |
|  |  | mass % | 9.9 | 15.2 | 10.1 | 10.3 | — | — | — | — | — |
|  | DEC | g | — | — | — | — | — | — | — | 0.29 | — |
|  |  | mmol | — | — | — | — | — | — | — | 2.5 | — |
|  |  | mass % | — | — | — | — | — | — | — | 16.1 | — |
| $N_A/N_{Li}$ ratio |  |  | 4.0 | 4.0 | 4.0 | 4.0 | 6.5 | 10.0 | 5.2 | 1.3 | 8.0 |
| $(N_A + N_B)/N_{Li}$ ratio |  |  | 5.6 | 6.5 | 5.6 | 5.6 | 8.0 | 10.5 | 7.9 | 5.3 | 8.0 |
| Solubility |  |  | ○ | ○ | ○ | ○ | ○ | ○ | ○ | ○ | ○ |
| Conductivity |  | S/m | 0.60 | 0.72 | 0.39 | 0.17 | 0.36 | 0.28 | 0.56 | 0.28 | 0.59 |
| Negative electrode reactivity | Heat generation peak temperature |  | ◎ | ◎ | ◎ | ◎ | ○ | △ | ◎ | △ | △ |
|  | Heat value at 200° C. [μW] |  | 480 | 760 | 700 | 1500 | 1930 | 510 | 120 | 480 | 580 |
| Positive electrode reactivity | Heat generation peak temperature |  | ◎ | ◎ | ◎ | ◎ | ○ | ○ | △ | ○ | ○ |
|  | Heat value at 200° C. [μW] |  | 350 | 650 | 470 | 820 | 1580 | 1800 | 1290 | 2590 | 2300 |

As shown in Tables 1 to 5, the non-aqueous electrolyte solutions in Ex. 1 to 24, 30 and 31 wherein the lithium salt was composed solely of LiPF$_6$, and a fluorinated solvent (α) and a cyclic carboxylic acid ester compound were contained, showed low negative electrode reactivity and positive electrode reactivity and exhibited good heat generation behavior. Further, the non-aqueous electrolyte solution in Ex. 23 wherein the cyclic carboxylic acid ester compound was 5 equivalents to the lithium salt, and the non-aqueous electrolyte solution in Ex. 24 wherein the cyclic carboxylic acid ester compound was 6 equivalents to the lithium salt, had high heat generation peak temperatures in the reaction with the negative electrode and exhibited superior heat generation behavior, as compared with the non-aqueous electrolyte solution in Ex. 38 wherein the cyclic carboxylic acid ester compound was 8 equivalents to the lithium salt. Further, the non-aqueous electrolyte solutions in Ex. 20 to 22 wherein $N_A/N_{Li}$ was 4.0, and $(N_A+N_B)/N_{Li}$ was from 3 to 7.0, had low positive electrode reactivity, as compared with the non-aqueous electrolyte solution in Ex. 28 wherein $N_A/N_{Li}$ was 4.0, but $(N_A+N_B)/N_{Li}$ was as large as 7.4. This indicates that it is possible to increase the stability of a battery by controlling $N_A/N_{Li}$ to be from 1.5 to 7.0 and further controlling $(N_A+N_B)/N_{Li}$ to be from 3 to 7.0. Further, the non-aqueous electrolyte solution in Ex. 32 wherein the lithium salt was composed of LiPF$_6$ and LiBF$_4$, and the non-aqueous electrolyte solution in Ex. 33 wherein the lithium salt was composed solely of LiBF$_4$, also had low negative electrode reactivity and positive electrode reactivity and exhibited good heat generation behavior, but in the non-aqueous electrolyte solution in Ex. 33 wherein LiPF$_6$ was not contained, the conductivity of the electrolyte solution tended to be low.

On the other hand, in the non-aqueous electrolyte solution in Ex. 25 wherein the amount of the compound (5) was increased without using the fluorinated solvent (α), the heat generation peak temperature in the reaction with the negative electrode was at least 150° C. and less than 180° C., and the negative electrode reactivity was large. In the non-aqueous electrolyte solution in Ex. 27 which was a common carbonate electrolyte solution without using the fluorinated solvent (α), the heat generation peak temperature in the reaction with the positive electrode was at least 150° C. and less than 180° C., and the positive electrode reactivity was large. In the non-aqueous electrolyte solution in Ex. 26 using no compound (5), both the positive electrode and the negative electrode had low heat generation peak temperatures, and the heat value at 200° C. was large and the stability was low. In the non-aqueous electrolyte solution in Ex. 28 wherein the content of the fluorinated solvent (α) was less than 40 mass %, although the heat value at 200° C. of the positive electrode was low as compared with Ex. 27 containing no cyclic carboxylic acid ester, the heat generation peak temperature in the reaction with the positive electrode was at least 150° C. ant less than 180° C., and the positive electrode reactivity was large. Further, in Ex. 29 wherein LiPF$_6$ was used as a lithium salt, and $N_A/N_{Li}$ was less than 1.5, it was not possible to uniformly dissolve the lithium salt.

Further, in Ex. 34 and 35 wherein $N_A/N_{Li}$ was larger than 7.0, the heat generation peak temperature in the reaction with the positive electrode and the negative electrode was less than 200° C., and as compared with Ex. 1 to 24, the reactivity of the non-aqueous electrolyte solution with the electrodes was large. Further, in Ex. 36A wherein $N_A/N_{Li}$ was from 1.5 to 7.0, but $(N_A+N_B)/N_{Li}$ was larger than 7.0, the negative electrode reactivity was low, so that thermal runaway by a reaction at the negative electrode was less likely to occur, but the positive electrode reactivity was large. This indicates that it is possible to further increase the stability of a battery by controlling $N_A/N_{Li}$ to be from 1.5 to 7.0 and further controlling $(N_A+N_B)/N_{Li}$ to be from 3 to 7.0. Further, in Ex. 37 wherein $N_A/N_{Li}$ was less than 1.5, the reactivity was high with both the positive electrode and the negative electrode.

(Evaluation of Cycle Properties)

Ex. 39

The above-mentioned positive electrode and negative electrode were faced to each other, and between them, a polyolefin type finely porous film was interposed as a separator. The non-aqueous electrolyte solution (0.5 mL) in Ex. 12 was added thereto to prepare a cell made of $LiCoO_2$ electrode-graphite electrode.

With respect to the obtained cell, the following charging/discharging cycles were carried out. In cycle 1, constant current charging to 3.4 V was carried out at 25° C. at a current corresponding to 0.01 C, further constant current charging to 4.2V was carried out at a current corresponding to 0.2 C, and further, constant voltage charging was carried out at the charging upper limit voltage until the current value became a current corresponding to 0.02 C. Then, constant current discharging to 3.0 V was carried out at a current corresponding to 0.2 C. In cycles 2 to 50, constant current charging to 4.2 V was carried out at a current corresponding to 0.2 C, and further, constant voltage charging was carried out at the charging upper limit voltage until the current value became a current corresponding to 0.02 C. Then, constant current discharging to 3.0 V was carried out at a current corresponding to 0.2 C. The cycle properties were evaluated by taking, as the discharge capacity retention ratio, the discharge capacity in cycle 30 and in cycle 50, to the discharge capacity per unit weight of the positive electrode active material in cycle 10.

The evaluation results of the cycle properties are shown in Table 6.

TABLE 6

| Non-aqueous electrolyte solution | | Ex. 39 Ex. 12 |
|---|---|---|
| Discharge capacity (cycle 10) [mAh/g] | | 124 |
| Discharge capacity | Cycle 30 | 95.0 |
| retention ratio [%] | Cycle 50 | 89.1 |

As shown in Table 6, the cell using the non-aqueous electrolyte solution of the present invention exhibited good cycle properties.

Example II

The following Examples are ones relating to an electrolyte solution containing a non-fluorinated cyclic carbonate compound. Ex. 1A to 5A are Examples of the present invention, and Ex. 6A and 7A are Comparative Examples.

Ex. 1A $LiPF_6$ (0.15 g) as a lithium salt was dispersed in $CF_3CH_2OCF_2CF_2H$ (trade name: AE-3000, manufactured by Asahi Glass Company Limited) (1.02 g) as the compound (1), and then, γ-butyrolactone (0.34 g) as the compound (5) was mixed thereto to obtain a uniform solution. Then, to the solution, vinylene carbonate as the compound (6) was added to be 2 mass % to obtain a non-aqueous electrolyte solution 1A.

Ex. 2A to 7A

Non-aqueous electrolyte solutions 2A to 7A were obtained in the same manner as in Ex. 1A except that the composition of the lithium salt and various compounds was changed as shown in Table 7.

Further, abbreviations in Table 7 have the following meanings.

VC: vinylene carbonate
FEC: fluoroethylene carbonate
Others are the same as in <Example I>.

Solubility

In the same manner as in <Example I>, evaluation of the solubility of the non-aqueous electrolyte solutions was carried out.

Ion Conductivity

In the same manner as in <Example I>, evaluation of the ion conductivity was carried out.

Charge/Discharge Test

A positive electrode and a negative electrode prepared in the same manner as in <Example I>, were faced to each other, and between such a positive electrode and a negative electrode, a polyolefin type finely porous film was interposed as an electrode separator for evaluation. The non-aqueous electrolyte solution (0.5 mL) obtained in each Ex. was added thereto to prepare a cell made of $LiCoO_2$ electrode-graphite electrode.

Using the obtained cell, in cycle 1, constant current charging to 3.4 V was carried out at 25° C. at a current corresponding to 0.01 C, further constant current charging to 4.2 V was carried out at a current corresponding to 0.2 C, and further, constant voltage charging was carried out at the charging upper limit voltage until the current value became a current corresponding to 0.02 C. Then, constant current discharging to 3.0 V was carried out at a current corresponding to 0.2 C. The ratio of the discharge capacity to the charge capacity in cycle 1 was evaluated as the initial charge/discharge properties.

In cycles 2 to 10, constant current charging to 4.2 V was carried out at a current corresponding to 0.2 C, and further, constant voltage charging was carried out at the charging upper limit voltage until the current value became a current corresponding to 0.02 C. Then, constant current discharging to 3.0 V was carried out at a current corresponding to 0.2 C.

In cycles 11 to 15, constant current charging to 4.2 V was carried out at a current corresponding to 0.2 C, and further, constant voltage charging was carried out at the charging lower limit voltage until the current value became a current corresponding to 0.02 C. Discharging was carried out by constant current discharging to 3.0 V at a current corresponding to 0.1 C in cycle 11, 0.2 C in cycle 12, 0.5 C in cycle 13, 1.0 C in cycle 14 and 2.0 C in cycle 15. As evaluation of the rate properties, the average discharge voltage during the 2.0 C discharging was measured.

Thereafter, in cycles 16 to 50, constant current charging to 4.2 V was carried out at a current corresponding to 0.2 C, and further, constant voltage charging was carried out at the charging lower limit voltage until the current value became a current corresponding to 0.02 C. Then, constant current discharging to 3.0 V was carried out at a current corresponding to 0.2 C. The cycle properties were evaluated by the discharge capacity retention ratio in cycle 30 and in cycle 50, to the discharge capacity per unit weight of the positive electrode active material in cycle 10.

The results are shown in Table 7.

Ex. 1B $LiPF_6$ (0.15 g) as a lithium salt was dispersed in $CF_3CH_2OCF_2CF_2H$ (trade name: AE-3000, manufactured by Asahi Glass Company Limited) (1.02 g) as the compound (1), and then, γ-butyrolactone (0.34 g) as the compound (5) was mixed thereto to obtain a uniform solution. Then, to the solution, fluoroethylene carbonate (4-fluoro-1,3-dioxolan-2-one, compound (8-1)) as the compound (8) was added to be 2 mass % to obtain a non-aqueous electrolyte solution 1B.

TABLE 7

| | | | Ex. 1A | Ex. 2A | Ex. 3A | Ex. 4A | Ex. 5A | Ex. 6A | Ex. 7A |
|---|---|---|---|---|---|---|---|---|---|
| Lithium salt | $LiPF_6$ | g | 0.15 | 0.15 | 0.15 | 0.15 | 0.15 | 0.15 | 0.15 |
| | | mmol | 1.0 | 1.0 | 1.0 | 1.0 | 1.0 | 1.0 | 1.0 |
| | | mass % | 9.5 | 9.8 | 10.0 | 9.8 | 9.6 | 10.0 | 10.0 |
| Compound (1) | AE3000 | g | 1.02 | 1.02 | 1.02 | 1.02 | — | 1.02 | — |
| | | mass % | 63.9 | 65.9 | 67.1 | 65.6 | — | 67.3 | — |
| | HFE458 | g | — | — | — | — | — | — | — |
| | | mass % | — | — | — | — | — | — | — |
| | HFE5510 | g | — | — | — | — | 0.87 | — | 0.87 |
| | | mass % | — | — | — | — | 55.4 | — | 56.4 |
| Compound (3) | MFA | g | — | — | — | — | 0.17 | — | 0.17 |
| | | mass % | — | — | — | — | 11.1 | — | 11.3 |
| Compound (5) | GBL | g | 0.34 | 0.34 | 0.34 | 0.34 | 0.34 | 0.34 | 0.34 |
| | | mmol | 4.0 | 4.0 | 4.0 | 4.0 | 4.0 | 4.0 | 4.0 |
| | | mass % | 21.6 | 22.3 | 22.7 | 22.1 | 21.9 | 22.7 | 22.4 |
| Compound (6) | VC | g | 0.076 | 0.030 | 0.003 | 0.008 | 0.031 | — | — |
| | | mmol | 0.88 | 0.35 | 0.04 | 0.09 | 0.36 | — | — |
| | | mass % | 5.0 | 2.0 | 0.2 | 0.5 | 2.0 | — | — |
| Other component | FEC | g | — | — | — | 0.030 | — | — | — |
| | | mmol | — | — | — | 0.29 | — | — | — |
| | | mass % | — | — | — | 2.0 | — | — | — |
| | $N_A/N_{Li}$ ratio | | 4.0 | 4.0 | 4.0 | 4.0 | 4.0 | 4.0 | 4.0 |
| | $(N_A + N_B)/N_{Li}$ ratio | | 4.0 | 4.0 | 4.0 | 4.0 | 4.0 | 4.0 | 4.0 |
| | Solubility | | ○ | ○ | ○ | ○ | ○ | ○ | ○ |
| | Ion conductivity | S/m | 0.64 | 0.64 | 0.64 | 0.64 | 0.49 | 0.64 | 0.49 |
| Charge/discharge test | Initial charge/discharge properties | % | 81.1 | 81.3 | 80.2 | 79.7 | 76.1 | 74.8 | 58.6 |
| | Capacity retention ratio in cycle 30 | % | 94.0 | 92.9 | 91.3 | 92.3 | 93.1 | 90.4 | 83.6 |
| | Capacity retention ratio in cycle 50 | % | 90.4 | 88.3 | 85.5 | 87.8 | 89.0 | 83.3 | 74.0 |
| | Average discharge voltage at 2.0 C | V | 3.57 | 3.55 | 3.57 | 3.60 | 3.49 | 3.44 | 3.57 |

As shown in Table 7, in Ex. 1A to 5A using the non-aqueous electrolyte solutions of the present invention containing a cyclic carboxylic acid ester compound and a non-fluorinated unsaturated cyclic carbonate compound, sufficient initial charge/discharge properties were obtained, and excellent cycle properties and rate properties were obtained.

On the other hand, in Ex. 6A and 7A not using a non-fluorinated unsaturated cyclic carbonate compound, both the initial charge/discharge properties and the rate properties and cycle properties, were inferior, as compared with Ex. 1A to 5A.

Example III

The following Examples are ones relating to an electrolyte solution containing a fluorinated cyclic carbonate compound. Ex. 1B to 5B are Examples of the present invention, and Ex. 6B and 7B are Comparative Examples.

Ex. 2B to 7B

Non-aqueous electrolyte solutions 2B to 7B were obtained in the same manner as in Ex. 1B except that the composition of the lithium salt and various compounds was changed as shown in Table 8. Here, abbreviations in Table 8 have the same meanings as above.

Solubility

In the same manner as in <Example I>, evaluation of the solubility of the non-aqueous electrolyte solutions was carried out.

Ion Conductivity

In the same manner as in <Example I>, evaluation of the ion conductivity was carried out.

Charge/Discharge Test

In the same manner as in <Example II>, the charge/discharge test was carried out.
The results are shown in Table 8.

nese Patent Application No. 2012-071068 filed on Mar. 27, 2012, Japanese Patent Application No. 2012-233286 filed on Oct. 22, 2012, and Japanese Patent Application No. 2013-022593 filed on Feb. 7, 2013. The contents of those applications are incorporated herein by reference in their entireties.

TABLE 8

|  |  |  | Ex. 1B | Ex. 2B | Ex. 3B | Ex. 4B | Ex. 5B | Ex. 6B | Ex. 7B |
|---|---|---|---|---|---|---|---|---|---|
| Lithium salt | $LiPF_6$ | g | 0.15 | 0.15 | 0.15 | 0.15 | 0.15 | 0.15 | 0.15 |
|  |  | mmol | 1.0 | 1.0 | 1.0 | 1.0 | 1.0 | 1.0 | 1.0 |
|  |  | mass % | 9.5 | 9.8 | 10.0 | 9.8 | 9.6 | 10.0 | 10.0 |
|  | $LiBF_4$ | g | — | — | — | 0.008 | — | — | — |
|  |  | mmol | — | — | — | 0.08 | — | — | — |
|  |  | mass % | — | — | — | 0.5 | — | — | — |
| Compound (1) | AE3000 | g | 1.02 | 1.02 | 1.02 | 1.02 | — | 1.02 | — |
|  |  | mass % | 63.9 | 65.9 | 67.1 | 65.6 | — | 67.3 | — |
|  | HFE5510 | g | — | — | — | — | 0.87 | — | 0.87 |
|  |  | mass % | — | — | — | — | 55.3 | — | 56.4 |
| Compound (3) | MFA | g | — | — | — | — | 0.17 | — | 0.17 |
|  |  | mass % | — | — | — | — | 11.1 | — | 11.3 |
| Compound (5) | GBL | g | 0.34 | 0.34 | 0.34 | 0.34 | 0.34 | 0.34 | 0.34 |
|  |  | mmol | 4.0 | 4.0 | 4.0 | 4.0 | 4.0 | 4.0 | 4.0 |
|  |  | mass % | 21.6 | 22.3 | 22.7 | 22.2 | 22.0 | 22.7 | 22.4 |
| Compound (6) | FEC | g | 0.076 | 0.030 | 0.003 | 0.030 | 0.031 | — | — |
|  |  | mmol | 0.72 | 0.29 | 0.03 | 0.29 | 0.29 | — | — |
|  |  | mass % | 5.0 | 2.0 | 0.2 | 2.0 | 2.0 | — | — |
|  | $N_A/N_{Li}$ ratio |  | 4.0 | 4.0 | 4.0 | 4.0 | 4.0 | 2.0 | 4.0 |
|  | $(N_A + N_B)/N_{Li}$ ratio |  | 4.0 | 4.0 | 4.0 | 4.0 | 4.0 | 2.0 | 4.0 |
|  | Solubility |  | ○ | ○ | ○ | ○ | ○ | ○ | ○ |
|  | Ion conductivity | S/m | 0.64 | 0.64 | 0.64 | 0.64 | 0.49 | 0.64 | 0.49 |
| Charge/discharge test | Initial charge/discharge properties | % | 83.9 | 81.7 | 79.9 | 78.9 | 64.3 | 74.8 | 58.6 |
|  | Capacity retention ratio in cycle 30 | % | 92.5 | 92.1 | 93.1 | 93.2 | 83.2 | 90.4 | 83.6 |
|  | Capacity retention ratio in cycle 50 | % | 86.9 | 86.7 | 88.2 | 88.7 | 73.7 | 83.3 | 74.0 |
|  | Average discharge voltage at 2.0 C | V | 3.59 | 3.60 | 3.55 | 3.59 | 3.50 | 3.44 | 3.57 |

As shown in Table 8, in Ex. 1B to 5B using the non-aqueous electrolyte solutions of the present invention containing a cyclic carboxylic acid ester compound and a fluorinated cyclic carbonate compound, sufficient initial charge/discharge properties were obtained, and excellent cycle properties and rate properties were obtained.

On the other hand, in Ex. 6B and 7B not using a fluorinated cyclic carbonate compound, both the initial charge/discharge properties and the rate properties and cycle properties, were inferior, as compared with Ex. 1B to 5B.

INDUSTRIAL APPLICABILITY

The non-aqueous electrolyte solution for secondary batteries of the present invention is useful as a non-aqueous electrolyte solution to be used for lithium ion secondary batteries for various applications to e.g. mobile phones, notebook computers, electric automobiles, etc., and is useful also for other charging devices such as an electric double-layer capacitor, a lithium ion capacitor, etc.

This application is a continuation of PCT Application No. PCT/JP2013/057445, filed on Mar. 15, 2013, which is based upon and claims the benefit of priority from Japanese Patent Application No. 2012-071067 filed on Mar. 27, 2012, Japa-

What is claimed is:

1. A non-aqueous electrolyte solution for secondary batteries, comprising a lithium salt and a liquid composition, wherein
the liquid composition comprises:
    a cyclic carboxylic acid ester compound;
    at least one fluorinated solvent (α) selected from the group consisting of a fluorinated ether compound, a fluorinated chain carboxylic acid ester compound and a fluorinated chain carbonate compound; and
    optionally, at least one compound (β) selected from the group consisting of a saturated cyclic carbonate compound having no fluorine atom, a chain carbonate compound having no fluorine atom, a saturated cyclic sulfone compound and a phosphoric acid ester compound,
the proportion of the mass of the fluorinated solvent (α) to the total mass of the non-aqueous electrolyte solution is from 40 to 80 mass %,
$N_A/N_{Li}$, which is the ratio of the total number of moles ($N_A$) of the cyclic carboxylic acid ester compound to the total number of moles ($N_{Li}$) of lithium atoms derived from the lithium salt, is from 1.5 to 7.0, ($N_A+N_B$)/$N_{Li}$, which is the ratio of the sum of said $N_A$ and the total number of moles ($N_B$) of the compound (β) to said $N_{Li}$, is from 3 to 7.0, the lithium salt comprises $LiPF_6$, and the proportion of the number of moles of $LiPF_6$ to the total number of moles of the lithium salt is at least 40 mol %, and the fluorinated solvent (α) comprises the fluorinated ether compound, and the proportion of the mass of the fluorinated ether compound to the total mass of the fluorinated solvent (α) is at least 30 mass %.

2. The non-aqueous electrolyte solution for secondary batteries according to claim 1, wherein said $N_A/N_{Li}$ is from 1.5 to 5.5, and said ($N_A+N_B$)/$N_{Li}$ is from 3 to 6.5.

3. The non-aqueous electrolyte solution for secondary batteries according to claim 2, wherein the liquid composition further comprises an unsaturated cyclic carbonate compound having no fluorine atom.

4. The non-aqueous electrolyte solution for secondary batteries according to claim 3, wherein the content of the unsaturated cyclic carbonate compound having no fluorine atom in the non-aqueous electrolyte solution is from 0.01 to 10 mass %.

5. The non-aqueous electrolyte solution for secondary batteries according to claim 2, wherein the liquid composition further comprises a fluorinated cyclic carbonate compound.

6. The non-aqueous electrolyte solution for secondary batteries according to claim 5, wherein the content of the fluorinated cyclic carbonate compound in the non-aqueous electrolyte solution is from 0.01 to 10 mass %.

7. The non-aqueous electrolyte solution for secondary batteries according to claim 1, wherein the liquid composition comprises the saturated cyclic carbonate compound having no fluorine atom.

8. The non-aqueous electrolyte solution for secondary batteries according to claim 1, wherein the liquid composition comprises the chain carbonate compound having no fluorine atom.

9. The non-aqueous electrolyte solution for secondary batteries according to claim 1, wherein the cyclic carboxylic acid ester compound is at least one member selected from the group consisting of γ-butyrolactone and γ-valerolactone.

10. The non-aqueous electrolyte solution for secondary batteries according to claim 1, wherein the proportion of the mass of the cyclic carboxylic acid ester compound to the total mass of the non-aqueous electrolyte solution is from 4 to 50 mass %.

11. The non-aqueous electrolyte solution for secondary batteries according to claim 1, wherein the lithium ion conductivity at 25° C. of the non-aqueous electrolyte solution is at least 0.3 S/m.

12. The non-aqueous electrolyte solution for secondary batteries according to claim 1, wherein the content of the lithium salt in the non-aqueous electrolyte solution is from 0.1 to 3.0 mol/L.

13. A lithium ion secondary battery comprising:
a positive electrode comprising a material capable of absorbing and desorbing lithium ions;
a negative electrode comprising at least one member selected from the group consisting of metal lithium, an lithium alloy and a carbon material capable of absorbing and desorbing lithium ions; and
the non-aqueous electrolyte solution for secondary batteries as defined in claim 1.

14. The non-aqueous electrolyte solution for secondary batteries according to claim 1, wherein the content of the lithium salt in the non-aqueous electrolyte solution is from 0.5 to 1.8 mol/L.

15. The non-aqueous electrolyte solution for secondary batteries according to claim 1, wherein the proportion of the number of moles of $LiPF_6$ to the total number of moles of the lithium salt is at least 65 mol %.

16. The non-aqueous electrolyte solution for secondary batteries according to claim 1, wherein the proportion of the number of moles of $LiPF_6$ to the total number of moles of the lithium salt is at least 80 mol %.

17. The non-aqueous electrolyte solution for secondary batteries according to claim 1, wherein said $N_A/N_{Li}$ is from 2.0 to 5.0.

18. The non-aqueous electrolyte solution for secondary batteries according to claim 1, wherein said ($N_A+N_B$)/$N_{Li}$ is from 3.2 to 6.0.

* * * * *